(12) United States Patent
Yoon

(10) Patent No.: US 12,225,008 B1
(45) Date of Patent: *Feb. 11, 2025

(54) SYSTEM AND METHOD FOR STREAMLINED USER AUTHENTICATION ON A SERVER USING A SECURELY STORED CLIENT IDENTIFIER

(71) Applicant: DG VENTURES, LLC, Gaithersburg, MD (US)

(72) Inventor: Jung Yoon, Laurel, MD (US)

(73) Assignee: DG Ventures, LLC, Gaithersburg, MD (US)

( * ) Notice: Subject to any disclaimer, the term of this patent is extended or adjusted under 35 U.S.C. 154(b) by 328 days.

This patent is subject to a terminal disclaimer.

(21) Appl. No.: 17/651,582

(22) Filed: Feb. 18, 2022

(51) Int. Cl.
 *H04L 9/40* (2022.01)
(52) U.S. Cl.
 CPC .............................. *H04L 63/0884* (2013.01)
(58) Field of Classification Search
 CPC .................................................. H04L 63/0884
 See application file for complete search history.

(56) References Cited

U.S. PATENT DOCUMENTS

| | | | |
|---|---|---|---|
| 10,135,835 B1 | 11/2018 | Kandel et al. | |
| 10,194,320 B1 | 1/2019 | Egner | |
| 10,204,339 B2 | 2/2019 | Madisetti et al. | |
| 10,210,527 B2 | 2/2019 | Radocchia et al. | |
| 10,277,398 B2 | 4/2019 | Weimer et al. | |
| 10,333,706 B2 | 6/2019 | Smith et al. | |
| 10,333,934 B1* | 6/2019 | Fox | H04L 67/02 |
| 10,382,485 B2* | 8/2019 | Won | H04W 4/70 |
| 10,382,965 B2 | 8/2019 | Spangemacher et al. | |
| 11,245,690 B1* | 2/2022 | Yoon | G06F 21/64 |
| 2015/0288694 A1* | 10/2015 | Liebl, III | H04L 9/3247 |
| | | | 713/182 |
| 2019/0036698 A1* | 1/2019 | Anglin | H04L 9/3236 |
| 2019/0207784 A1* | 7/2019 | Aizikovich | G06F 9/45558 |
| 2020/0004946 A1* | 1/2020 | Gilpin | H04L 9/50 |
| 2020/0204567 A1* | 6/2020 | Kyung | H04L 9/08 |
| 2022/0159029 A1* | 5/2022 | Bendersky | H04L 63/18 |

* cited by examiner

*Primary Examiner* — Chau Le
(74) *Attorney, Agent, or Firm* — Rosenberg, Klein & Lee

(57) ABSTRACT

A system and method provide streamlined restricted access to a secure server through a communications network. A client identifier parameter value is established and uniquely associated with a user registering with an authentication server, and is stored in at least first and second predetermined storage forms within a data storage system, the first form readable exclusively by a client device of the user and the second form readable by the authentication server. The client device then authenticates by retrieving the client identifier parameter value from the data storage system and providing it to the authentication server, which independently retrieves the client identifier parameter value from the data storage system for comparison, and initiates an interactive communication session between the client device and the secure server responsive to the comparison. Between comparisons, the client identifier parameter values are stored exclusively on the data storage system and deleted from all other devices.

20 Claims, 10 Drawing Sheets

SYSTEM AND METHOD FOR STREAMLINED USER AUTHENTICATION ON A SERVER USING A SECURELY STORED CLIENT IDENTIFIER

BACKGROUND OF THE INVENTION

The subject system and method are generally directed to streamlined restricted access to a secure server through a communications network for an authentication-based interactive communication session. The system and method generally provide for initiation of the communication session without interactive self-authentication by a use, using a client identifier which is uniquely associated with the user and which is securely and immutably stored when not used.

On a communications network such as the Internet, it is commonly necessary for a user to prove their identity to a remote server, in order to access the restricted functions of the server. These restricted functions can include access to confidential or other private data, execution of financial transactions, and transmission of communications where it is important to know the identity of the communicator. The process of proving the user's identity is known as user authentication, which has been an ongoing area of development in the field of computer security. The most common approach to user authentication through the Internet is for a user to provide a username and password, which are confirmed to be correct by the remote server or a related server. Once the user is authenticated, the server provides the restricted functions which the user is permitted to use, through an interactive communication session. However, the username and password approach suffers from certain security flaws, counters to which are constantly being developed.

SUMMARY OF THE INVENTION

It is an object of the disclosed system and method to replace the username and password approach to user authentication with a different, more secure approach which avoids the security vulnerabilities of the former.

It is another object of the disclosed system and method to authenticate a user in an automatic and streamlined manner which does not require interaction by the user.

It is yet another object of the disclosed system and method to securely store a user identifier parameter between authentications in a form which is easily accessible by the desired entities yet inaccessible to any entity not authorized to access it.

It is still another object of the disclosed system and method to immutably store the data necessary to authenticate a user, in a distributed system which can defend against denial of service attacks.

These and other objects may be attained in a system and method for streamlined user authentication on a server using a securely stored client identifier. In accordance with certain embodiments of the present invention, a method is provided for restricted access to a secure server through a communications network for an authentication-based interactive communication session therewith initiated without interactive self-authentication by a user. The method includes establishing a client identifier parameter uniquely associated with a user. The method also includes storing the client identifier parameter in at least first and second predetermined storage forms as immutable records within a distributed data storage system. The client identifier parameter in the first predetermined storage form is readable from the data storage system exclusively by a client device of the user uniquely associated therewith. The client identifier parameter in the second predetermined storage form is readable from the data storage system by an authentication server. The method also includes executing a processor to authenticate the user to initiate an interactive communication session between the client device of the user and the secure server. The authentication includes comparing the client identifier parameter as independently retrieved from the data storage system respectively by the client device and the authentication server. The interactive communication session is initiated responsive to the comparison. The authentication also includes deleting the client identifier parameter from both the client device and the secure server upon initiation of the interactive communication session.

In accordance with other embodiments of the present invention, a system is provided for streamlined restricted access to a secure server through a communications network for an authentication-based interactive communication session therewith initiated without interactive self-authentication by a user. The system includes an identifier allocator executing on a processor to generate a client identifier parameter uniquely associated with a user. The system also includes a distributed data storage system configured to store data transmitted thereto as immutable records. The system also includes an authentication server. The authentication server includes a server processor. The authentication server also includes a storage request module configured to store on the data storage system at least the client identifier parameter in a first predetermined storage form readable exclusively by a client device of the user uniquely associated therewith, and the client identifier parameter in a second predetermined storage form readable by the authentication server. The authentication server also includes a user authenticator executing on the server processor to compare the client identifier parameter as independently retrieved from the data storage system respectively by the client device and the authentication server. The authentication server also includes a communication module configured to initiate an interactive communication session between the client device of the user and the secure server responsive to the comparison executed by the user authenticator. The client identifier parameter is deleted from both the client device and the authentication server upon initiation of the interactive communication session.

In accordance with still other embodiments of the present invention, a system is provided for streamlined user authentication by a secure server without interactive self-authentication by a user in order to establish a restricted communication session between the secure server and a client device of the user. The system includes an identifier allocation module executing on a processor to generate a client identifier value uniquely associated with a client device of the user. The system also includes a distributed data storage system openly accessible through the communications network and configured to store records in an immutable state. The system also includes an authentication server. The authentication server includes a server processor. The authentication server also includes a storage request module executing on the server processor to store on the data storage system at least the client identifier value in a first predetermined storage form which is readable from the data storage system exclusively by the client device uniquely associated therewith, and the client identifier value in a second predetermined storage form which is readable from the data storage system by the authentication server. The authentication server also includes a user authenticator executing on the server processor to compare the client identifier value as independently retrieved from the data storage system respectively by the client device and the secure server. The authentication server also includes a communication module configured to initiate a restricted communication session between the client device of the user and the secure server responsive to the comparison of the user authenticator. The client identifier value is deleted from both the client device and the authentication server upon initiation of the restricted communication session.

Additional aspects, details, and advantages of the disclosed system and method will be set forth, in part, in the description and figures which follow.

DETAILED DESCRIPTION OF THE PREFERRED EMBODIMENTS

Figure 1A:
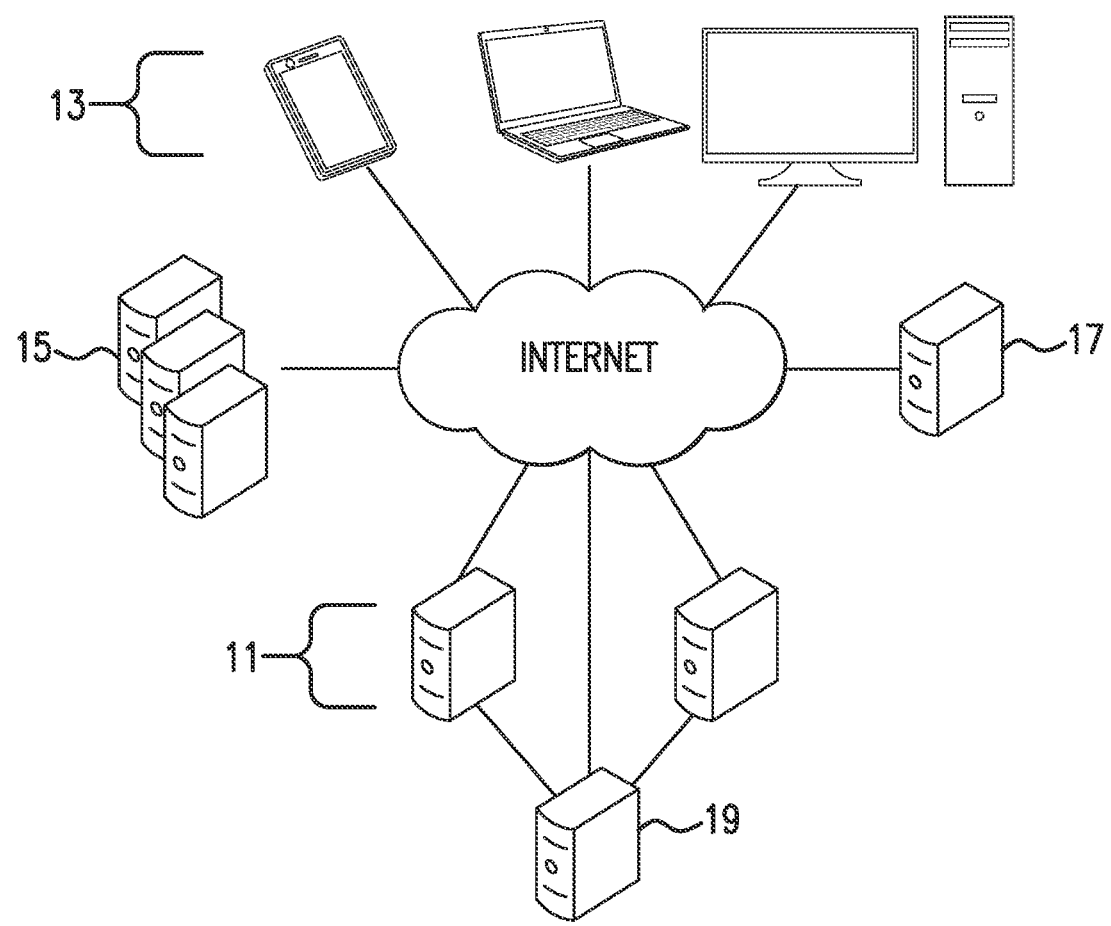
FIG. 1A is a block diagram illustrating a system for streamlined restricted access to a secure server, in accordance with an exemplary embodiment of the present invention.

Reference will now be made in detail to exemplary embodiments, which are illustrated in the accompanying drawings, wherein like reference numerals refer to the like elements throughout. The embodiments are described below in order to explain the disclosed system and method with reference to the figures illustratively shown in the drawings for certain exemplary embodiments for sample applications.

Section headings are included in this Detailed Description. It is noted that these section headings are for convenience only and should not be interpreted as limiting the scope of the claimed invention in any way.

Within a communications network, the traditional paradigm for credential verification on a secure server operably linked to that network, such as a website server on the Internet, is the username and password. A user provides one or both of a username and password (uniquely assigned to that user) to the server in order to "log in" and access the secured features of the secure server. Both the username and password are transmitted from the user's device to the desired secure server, or to a separate but coupled authentication server or "login server," each time the user wishes to log in. Additionally, copies of the username and password are stored during a registration process in a form and place available to the server at all times, for later comparison to the transmitted username and password at the time of log in.

These requirements result in security vulnerabilities which could allow a malicious party to gain access to the username and password or to otherwise access the server in place of the user. A malicious party could steal the username and password from the server, the user, or any transmission of the username and password between the two. Of the three, the user is a particularly vulnerable target, being the least likely to observe secure practices in keeping the username and password safe. Furthermore, a malicious party could alter the username or password stored on the server, allowing the party to then use the altered username and password to gain access. These vulnerabilities are currently being addressed in the art in various ways and with varying degrees of success.

Briefly, a system and method realized in accordance with certain aspects of the present invention provide for replacement of this paradigm with a safer authentication paradigm, in which a user credential is securely stored external to both a user's device and an authentication server, and is only present on either during the authentication process itself. Additionally, the login process for initiating a secure interactive session with the secure server occurs automatically and unintrusively, preferably in a seamless, transparent manner without the interaction or even awareness of the user. As a result, numerous ways in which the security of heretofore known login processes might otherwise be compromised are obviated. Such features of external secure storage and automated initiation of secure interactive session are preferably combined with other security features to better ensure the safety of the user credential at other points in the process.

Preferably, a user credential takes the form of a client identifier parameter or value which corresponds to the user. The client identifier parameter is stored, preferably in an encrypted form which can be decrypted only by the device or by the authentication server, on an external data storage system. When the user wishes to be authenticated on the secure server, the device automatically retrieves a copy of the client identifier parameter, transmits it to the authentication server, and promptly deletes it from the device. The authentication server, upon receiving the client identifier from the client, also independently retrieves a copy of the client identifier parameter from the external data storage system, and initiates a communication session between the secure server and the device if the two match. The authentication server then, like the client, deletes all copies of the client identifier parameter. This leaves nothing for a hacker to steal from, or alter on, either the client or the servers. The only permanently stored copies of the client identifier parameter are within the external data storage system, which can be made particularly secure using processes which will be described further herein. In particular, two copies of the client identifier parameter which are stored on the external data storage system are each in a form readable only by the client device and the authentication server (or related authentication servers), respectively. In combination with encryption processes which will also be described further herein, this approach also reduces or eliminates other security vulnerabilities that have continued to be a problem in login processes, especially in the context of Internet transmissions and Internet-connected systems which are accessible to hackers the world over.

1. Encryption Principles

Before going into further detail as to the invention and its embodiments, it is necessary to describe various encryption principles which are relevant to certain embodiments of the present invention, including public-private key pairs, digital signatures, and cryptographic hashes.

It will be appreciated by those of skill in the art that the principles that follow are each applicable to encrypting or otherwise securing a wide variety of digital data and data content, including but not limited to documents, emails and other messages, passwords and other credentials, media files, software code, and databases.

A key pair, having a first key and second key, is an example of asymmetric cryptography. The keys of the key pair, which are typically lengthy numerical values or other strings of characters, are generated together to have particular qualities. Specifically, if particular algorithms use the second key as a parameter with which to encrypt data, the result can then only be decrypted using the first key. In some implementations, the inverse is also the case—the second key can decrypt data which has been encrypted by the first key—but this is not universal to all key pair generation algorithms. The two keys of a key pair are sometimes described as "paired" or "corresponding" with respect to each other; these terms will be used interchangeably throughout this disclosure. Algorithms for generation of key pairs are known in the art, and are employed in encryption systems including but not limited to TPS (Transport Layer Security), DSA (Digital Signature Algorithm), RSA (Rivest-Shamir-Adleman), and ECDSA (Elliptical Curve Digital Signature Algorithm). As such, the details of these generation algorithms, and of the encryption algorithms that employ them, will not be described further herein.

A security practice known as "public key cryptography" generates a key pair for an entity, and designates the first key to be the entity's "private" key and the second key to be the entity's "public" key. Copies of the public key are then shared publically, and are publically known to be associated with the entity, but the private key is kept secret by the entity. Anyone who wishes to securely send data content to the entity can use the public key to encrypt the content before transmission. As the encrypted content can only be decrypted and read by someone with the private key—i.e., the recipient entity—it is safe from outside access even if intercepted. When applied to this practice, the public key can be termed an encryption key and the private key can be termed a decryption key.

Public key cryptography can enable an additional security practice called a "digital signature." An entity having a public-private key pair can "sign" content by encrypting it, or a designated portion thereof, using the private key, and then attaching the encrypted result (typically described as the "signature" in this context) to the original, unencrypted content. For key pairs where the public key decrypts the encryption of the private key, a recipient of the signed content can use the public key to decrypt the signature and compare it to the original content. If they match, this proves two things at once: first, that the party who "signed" the content possesses the entity's private key, and is therefore presumed to be the entity, and second, that the content itself (or at least the designated portion of it) has not been altered since it was "signed."

When it is necessary to verify an identity but not also necessary to send useful content, an entity may generate a "nonce," which is a random series of characters. The entity may sign the nonce as described above, and transmit both the nonce and the signature, verifying the entity's identity in the same manner as shown above.

Additionally, a first entity may send a nonce as part of an identity verification request. The second entity encrypts the nonce using its private key and sends it back to the first entity. The first entity can then verify the second entity's identify in the same manner as shown above. Because the nonce is randomly generated on the spot, this approach avoids the risk that an imposter for the second entity might have intercepted a previous signed message and reused both the message and its signature.

It is further noted that a randomly generated nonce may be included with a message in encrypted form. When the recipient decrypts the message, it may then send the reply in encrypted form with the same nonce included. This may serve as additional confirmation that the latest message is from the intended recipient of the previous message, who could not know the nonce otherwise.

As noted previously, not all forms of generated key pairs enable the second (public) key to decrypt the encryption of its corresponding first (private) key. However, for certain forms of these non-invertible key pairs, signature verifiers exist and are known in the art which, when provided with a signature, a public key, and data content, can confirm that the signature is the result of encrypting the content with the private key which is paired with the public key. Such verifiers therefore still enable a recipient to confirm both the source of signed content and its untampered nature. As these verifiers are known in the art, they will not be further detailed herein.

One shorthand for encrypted data, which will be employed for convenience throughout this disclosure, is "K(content1, content2, . . . contentx)" to indicate that "content1" through "contentx" have been collectively encrypted with a suitable encryption algorithm using a key "K".

It should be noted that encryptions can be layered to enable a combination of security functions. As one example, consider that Alice wishes to send a message M to Bob. Alice first signs the message M with her own private key $A_{priv}$ to produce a digital signature, $A_{priv}(M)$, and appends $A_{priv}(M)$ to M. Alice then adds a second layer of encryption to the combination of the message M and the signature, with Bob's public key $B_{pub}$, to ensure that it cannot be read by anyone who does not have Bob's private key $B_{priv}$. This produces $B_{pub}(M, A_{priv}(M))$. It is noted that the copy of the message M within the digital signature is now under two layers of encryption, while an additional copy of the message M is under only one layer. When Bob receives $B_{pub}(M, A_{priv}(M))$, he can unencrypt the top layer of encryption, which used his public key $B_{pub}$, with his private key $B_{priv}$, and then read the message M. Upon decrypting the top layer, Bob can also access the signature $A_{priv}(M)$, which is still encrypted using Alice's private key $A_{priv}$. Bob can therefore decrypt or verify the signature using Alice's public key $A_{pub}$ and the unencrypted original message M, to confirm that M originated from Alice and that it was not altered.

Another encryption process is the cryptographic hash function. A hash function is one-way, meaning that content encrypted by the function cannot be decrypted. However, a hash function is also consistent, meaning that encrypting the same content with the same function will produce the same result (sometimes called the "digest" or the "hash value") every time. A hash function should furthermore be designed so that even similar content is extremely unlikely to produce the same hash value.

Because a hash function does not need to be reversible, it can be deliberately lossy. This enables various hash functions to produce a hash value of a consistent, predetermined character length or data size, regardless of the size of the original content being hashed. Such consistent size is preferable for the purpose of simplifying data storage of hash values, but is not required.

Cryptographic hash functions are known in the art, and include but are not limited to the various SHA (Secure Hash Algorithm) and MD (Message Digest) standards. As such, the details of their implementation will not be described herein.

A hash value can fill one of the same roles as a digital signature: content can be "hashed" at different times, and the two hash values compared to confirm that the content has not been altered in the interim.

Hash functions also enable the secure transmission and storage of password data or other credentials. A user providing a password to a login server during a signup process can "hash" the password before transmitting it, and then "hash" it again when entering it for each login process. As such, only the hash value of a password P—"hsh(P)"—and not the password P itself, is transmitted from the user's device, and the login server only receives and stores the hash value of the password. However, the login server can compare another hash value received at a later time with the stored hash value to confirm that it resulted from entry of the same (unknown) original password. Similar processes can be employed for credit card numbers, fingerprint data, and other credentials and identifiers which are stored for matching to a later-provided credential or identifier.

It is noted, however, that credential hashing is not invincible against hackers. A hacker can, for example, steal a stored hash value from the login server, and compare it to hash values of common or suspected passwords to determine if one is the correct password. Additionally, a hacker could enter the storage of a login server and replace a stored hash value of an unknown password, "hsh(P1)," with "hsh(P2)"; the hacker would then be able to log in using P2 as the password. In both cases, the password is made vulnerable by the storage of the password hash value on a potentially insecure login server.

In recognition of these flaws, one aim of the invention and embodiments thereof is to find a more secure means of credential storage.

2. Blockchain Principles

A "blockchain" is a data structure used to track changes to a data record over time. A blockchain includes a series of data "blocks" which are linked in order of their creation. The first and earliest block (sometimes called the "genesis block") contains the original state of the record, preferably alongside a creation timestamp, and in some cases other data. Each block that is then added represents one or more changes or amendments to the record. Each of these additional blocks also typically contains a creation timestamp, and in some cases other data. The collective set of blocks, ordered by creation timestamp, forms the blockchain.

In some blockchain implementations, the entire amended record is included in each new block. However, it is noted that a particular element of the record might not be amended in the latest block, and it can be more efficient to include only the latest amendments to the record in a new block. As such, in some blockchain implementations, some elements of the record are not represented in a given block.

In a preferable implementation, an index or address is applied to each element of the record. An element which is amended is included in amended form in a new block and labeled with the same address therein, and an element which is not amended, at the time the new block is added, is omitted from the new block. To find the current state of a particular element, the blockchain is searched, starting with the most recent block, for the address of that element. If the most recent block does not have that address, the search moves on to the next most recent block, and so on. The search will therefore locate the most recent state of the particular element of the record.

By design, a block, once added to a blockchain, is never validly altered or deleted, but is an immutable record. Any amendment to the record must instead be represented by adding another block to the chain, so that each amendment is tracked and reviewable. Alterations to existing blocks, if detected, invalidate the copy of the blockchain, as will be explained further below.

Each block except the genesis block also contains a cryptographic hash value of the contents of the previous block in the chain, or in some cases a specific portion of the contents. Using this hash value, it can be checked whether the previous block in the chain has been altered since the generation of the present block; for reasons previously explained in this disclosure, if a newly-generated hash value of the previous block does not match the hash value already stored in the present block, it can be determined that an impermissible alteration has occurred. Detection of such alterations can then generate an alert or even, in some circumstances, automatic correction, as described below.

As an additional security feature, a blockchain is preferably stored in a distributed and decentralized manner through a blockchain network. The blockchain network includes a large set of networked computers, typically on the scale of hundreds or thousands, each of which stores a copy of the blockchain. When a new block is to be added to the blockchain, one of the computers is designated by the network to generate the block and be the first to add it to the chain, and then the block is propagated throughout the network to add the same block to the copy of the chain stored on each computer. While it is possible that all computers in a blockchain network are under the control of the same entity (that is, the network is "private"), many implementations allow third parties to contribute computers to the network (that is, the network is "public").

In some implementations, the designation of which computer will generate the newest block is accomplished by some or all computers in the network participating in a "mining" process. Each computer participating in the mining process attempts to complete a mathematical problem based on the block contents, the solution to which will preferably make the containing block and/or its hash value easier to generate, manipulate, and/or store. Typically, this solution can only be found through brute force computation over several minutes, hence the "mining" metaphor. The first computer to solve the problem then generates the block and distributes both the block and the solution to the other computers in the network. The other computers each verify the solution, a much faster process than its initial determination, and accept the block for storage and further distribution if the solution is verified. If multiple computers solve the problem before distribution is complete, preferably the block with the earliest timestamp will be selected.

In one example implementation, the solution is a numerical value or character string such that, when it is added to the block contents, the hash value for the combined block contents will have particular designated qualities. As such, the mining process not only provides for a clear decision as to which computer will generate the block, but also ensures that the resulting hash values can be generated and/or verified more efficiently.

It is not generally seen as cost-efficient to add a new block for every amendment to the record. Rather, a group of new amendments are collected, and a block representing all pending amendments is generated and added to the blockchain. The blockchain system determines when to generate a new block based on suitable factors, which can include but are not limited to: time elapsed since the last block generation, the number of pending amendments, the expected size and/or complexity of the block, or some combination of the above.

In combination, the hash verification and the decentralized storage make alteration of an existing block of a blockchain, for example by a hacker, extremely difficult. As noted previously, an alteration to any but the latest block can be promptly detected by regular, automated checks against the hash value in the following block. Furthermore, such alterations are not automatically propagated through the network. Therefore, when a discrepancy is detected on a particular computer in the network, the correct block can be recovered from any of the other computers in the network and the compromised copy can be corrected. The system can additionally, in some cases, simply compare the copies of the chains to see if they disagree. In some systems, to confirm that a hacker has not attacked multiple computers in the network at once, the computers "vote" on the correct block, selecting the block found on the most computers in the network as the correct one and replacing incorrect blocks in the remaining computers accordingly.

As such, to successfully alter a single block in a blockchain on a distributed blockchain network, a hacker must (1) replace not only the block but every block following it in the chain, to avoid a hash value mismatch, and also (2) repeat this replacement on a majority of the computers in the network before the discrepancy between chain copies is detected. For a suitably large network with a suitably regular verification process, this is not feasible.

Blockchains are typically used as a public transactional ledger, in particular for cryptocurrencies such as Bitcoin and Ethereum. In a cryptocurrency system, the blockchain includes representations of all accounts for the given cryptocurrency, with each block in the chain representing a set of transactions to the accounts which occurred in a given period. Because both the blocks in the chain and the chain itself can be considered secure from alteration, the chain can be assumed to accurately represent the contents of the accounts, including all withdrawals and deposits, over time. Due to the security features of blockchains, it is generally considered safe to make the contents of a blockchain network publically and openly accessible through the Internet, and therefore entities can easily verify the value of each other's accounts when engaging in transactions.

Although amendments to the record, even in the context of a transactional ledger, are not always literally financial transactions, the term "transaction" has come to mean any amendment to the record in a blockchain system, and will be used with this meaning herein unless otherwise specified.

Various blockchain systems, including the aforementioned Bitcoin and Ethereum systems, exist in the art and vary in implementation details. However, although reading from a blockchain is trivial, making a change to the record in the blockchain requires considerable overall processing expense due to the above-described processes of mining, block generation, and block distribution. As such, the blockchain model is seen as cost-inefficient when an extreme level of security is not required, and blockchains are not typically used outside of the context of financial transactions.

Certain blockchain implementations, including but not limited to Ethereum and EOSIO, manage at least some operations through a "smart contract." A smart contract is a software program that manages requests related to certain associated data (e.g. data describing the current state of an Ethereum account), based on parameters designated in the contract. For example, a smart contract for an Ethereum account can designate particular entities which can deactivate the account. Such a smart contract, when executed, can also access other data which is stored in a suitable data storage outside the blockchain itself, such as an "active/inactive" flag for the account. The smart contract therefore includes, as another parameter, one or more "pointers" which designate where data managed by the smart contract is stored. The smart contract can both retrieve and amend the data using these pointers. In practice, all current data for an account can, in some implementations, be managed by the smart contract and stored using pointers to outside storage. This outside storage is preferably also distributed throughout the network, providing previously-described protections against denial-of-service and, to an extent, alteration by hackers. Further protections known in the art, including but not limited to a modified Merkle Patricia Trie, can also be implemented to protect the outside storage from unauthorized changes. However, the immutable record of amendments to the stored data is maintained in the blockchain and not the outside storage.

In an implementation without a smart contract, it is preferable to store all data for an account in each transaction related to an account, regardless of whether a particular data element was amended as part of the transaction, so that the current account data is retrievable from a single block rather than piecemeal from several blocks. However, this requires that the transaction size correspond to the size of the account data, making it inconvenient to have large amounts of data corresponding to an account. A smart contract implementation obviates this disadvantage, because all data for an account can be accessed from the corresponding smart contract's storage and does not need to be stored in the blockchain at all. Nonetheless, it is still necessary to store some form of confirmation that the change was authorized, using the protective security features of a blockchain, such that the evidence of the change is immutable and accessible. Therefore, a new transaction reflects the change by indicating that an amendment was made to specified data, or to a specified location in the smart contract storage, at the time of the transaction. In some implementations, the new transaction also contains the specific content of the amendment. This approach still reduces the time required to assemble the necessary data for the new transaction, and also reduces the total size of the transaction when it is stored in a block of the blockchain. Additionally, because there is no particular limit to the size of the smart contract's allocated storage, the approach allows more flexibility in what account data may be stored. For example, storage of large files such as media directly to the blockchain would require impractically large transactions, but this is not a concern when this media is stored and managed using a smart contract.

For additional efficiency of storage, rather than place the smart contract executable itself in a block of the blockchain, some implementations store the contract elsewhere. A storage address for the smart contract is stored in the blockchain, such that the smart contract can be retrieved and executed by reading the address from the blockchain.

In some implementations, such as Ethereum, the smart contract is stored immutably, such that the parameters of its code cannot be altered. This can be done by storing the smart contract directly in the blockchain, or by other methods known in the art. When it is desirable to alter these parameters—for example, to change the present storage location of an "active/inactive" flag—a new smart contract with the new parameters is generated. If the smart contract is stored directly into the blockchain, this new smart contract is stored in the same manner as any amendment to the record on the blockchain. If the smart contract is stored elsewhere, the address of the new smart contract is stored as an amendment to the old address in the blockchain.

In other implementations, such as EOSIO, the smart contract is stored mutably and may be amended directly rather than replaced with another smart contract. A mutable smart contract provides more flexibility, in particular scalability, for the addition and expansion of functions. However, an immutable smart contract is guaranteed to function consistently, such that parties may rely on its operation. For example, in the Ethereum implementation, in which smart contracts are immutable, the code for a smart contract is stored in readable format alongside its executable form, and an entity can be sure that the smart contract will consistently operate as the code describes. Such consistent operation allows for the automatic execution of payments, account permission changes and terminations, and other functions according to various conditions and other parameters, all in a predictable manner that is both transparent and safe from unexpected change.

In at least some implementations, at least one smart contract is generated for each account, and designates the locations for one or more data elements related to this account. Additionally, in certain implementations, it is desirable to use multiple smart contracts for one account, each contract managing different features of the account.

Various implementations of smart contracts are known in the art, each with their own specific methods of execution and data handling, and will not be described further herein. For the purposes of the present invention, it is sufficient to know that smart contracts can be implemented to manage any portion of the data which would otherwise be stored and amended in the blockchain itself, storing the data in a manner which does not require it to be written directly to a transaction in the blockchain.

However, due to the aforementioned need to keep immutable evidence of all changes to the record, smart contracts do not eliminate the need to write directly to the blockchain with each amendment.

3. System Embodiment

FIG. 1A shows one of numerous illustrative examples of embodiments for a system in accordance with the invention.

The embodiment illustrated in FIG. 1A includes authentication servers 11, client devices 13, a data storage system 15, a server registrar 17, and a secure server or authorization server 19. It will be understood that the system is not limited to any particular number of any of these features, and the numbers shown in the figures are selected solely for simplicity of illustration. In particular, it is noted that the server registrar 17 is entirely optional to the system.

The authentication servers 11, the client devices 13, the data storage system 15, and the server registrar 17 are all coupled through a communication network, such as the Internet. The secure server 19 is coupled to at least the authentication servers 11, and preferably though not necessarily to the communication network.

For simplicity of illustration and description, a system with one secure server 19 is illustrated and will be assumed herein. However, it is noted that multiple such servers may use a single system to control access. Indeed, the secure server 19 in at least some implementations is controlled by a third party, which contracts with the party controlling the authentication servers 11 for the authentication service. The system as a whole may therefore interface with many third-party secure servers 19 accessible across the Internet or other communication network.

It is also noted that, in certain implementations, the secure server 19 and the authentication server 11 may be the same server, and may authenticate access to its own secure functions by its own authentication functions.

Briefly, when a user wishes to register a client device 13 in the system, it communicates with an authentication server 11, which stores client identification data in two forms, one readable by the client device 13 and one by the authentication server 11, on the data storage system 15. Thereafter, when a user wishes to log the client device 13 into an interactive communication session with a secure server 19 in the system, it first communicates with the authentication server 11. Both the client device 13 and the authentication server 11 independently retrieve the client identification data from the data storage system 15, and the authentication server 11 compares this data, and in some embodiments other data, to confirm the identity of the client device 13. The authentication server 11 then initiates the interactive communication session between the client device 13 and the secure server 19.

For brevity in describing this system, the term "device" will refer to both client devices and servers hereinafter, when one or the other is not specified, and the term "client" will refer to client devices.

In a preferred embodiment of the present invention, each device has a public-private key pair, which is preferably generated on their respective devices. In certain embodiments, the private keys are stored in a specialized and secure key storage which is on the device, such as a Trusted Platform Module (TPM). In an alternative embodiment, the keys for at least some of the devices are generated and stored on a dongle.

The private keys preferably do not leave their respective devices. However, in some implementations, a private key is shared in a limited manner by related devices. For example, an authentication server private key can be shared among a group of authentication servers 11. In such implementations, any one of these servers 11 is enabled to perform the authentication server functions at any stage in the methods described further herein, without changing the server keys involved. This provides redundancy in the event that one of the servers 11 becomes unavailable or inaccessible.

The public keys are freely provided by their respective devices upon request, as described above, and may be made available from other sources as well. Additionally, because the public key is a public value which is unique to its device, it can serve as an index value for the device. The data storage system 15 can therefore use the public key of a device as the index or address for stored data associated with the device. Additionally, stored data associated with more than one device at once, such as authentication information for a client on a server, can be indexed with some combination of their public keys, such as a concatenation of the two, which can be termed their shared index. This arrangement is preferable as it reduces the data that needs to be transmitted, and will be assumed for convenience to be the case hereinafter. However, it is noted that some embodiments may provide a different approach to indexing data for a device or combination of devices. In such embodiments, it should be assumed that the index for a device is transmitted to another device which does not already have it whenever the public key of the device is also transmitted.

In a preferred embodiment of the present invention, the data storage system 15 is a distributed data storage system which is external to the authorization servers 19 and client devices 13. More preferably, the data storage system 15 is a blockchain network. In certain implementations, some or all of the computers of the blockchain network, or other data storage system 15, also serve as a group of authentication servers 11.

A new index, or address, for the data storage system 15 is generated for each new combination of client device 13 and authentication server 11, upon a registration of the client on the authentication server. The combination's address is preferably the combination of public keys for the client and authentication server, which can be termed their shared address. However, in various embodiments, the address can be any unique index which is available. The address is used in the data storage system 15 to indicate data for the same combination of client device 13 and authentication server 11. In a blockchain implementation, for example, the address of a given client-server combination is applied to any "transaction," or data amendment, made with respect to the client-server combination, in any block of the blockchain.

In embodiments with a server registrar 17, the authentication servers 11 and, in some embodiments, the authorization server 19 are registered thereon. Data from this registration is preferably also stored in the data storage system 15, although in some embodiments it remains on the server registrar 17.

Although a system with multiple authentication servers 11 is preferable in most circumstances, a single authentication server 11 will be generally assumed hereinafter, for convenience of description. Likewise, a single authorization server 19 will also be generally assumed. Those of skill in the art will be able to extrapolate the disclosures herein to a system with multiple servers of both types.

Figure 1B:
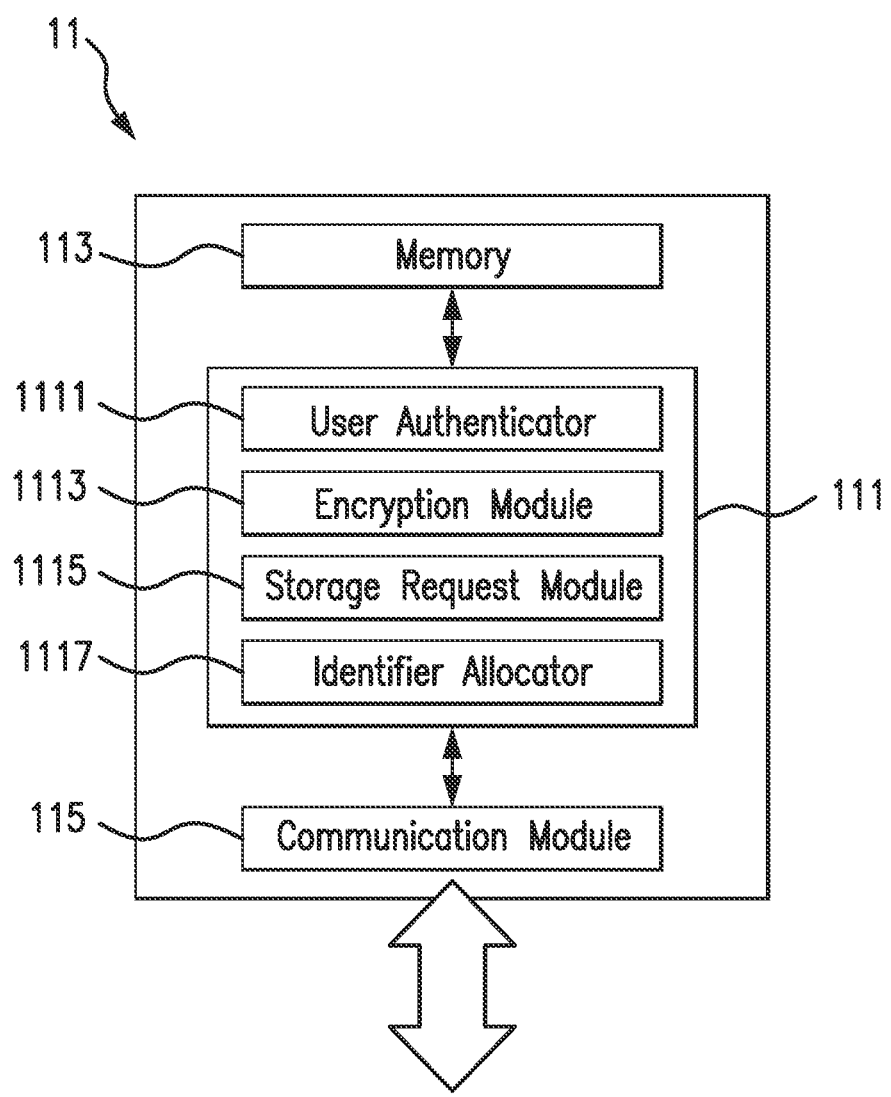
FIG. 1B is a block diagram illustrating an authentication server, in accordance with an exemplary embodiment of the present invention.

FIG. 1B shows one of numerous illustrative examples of embodiments for an authentication server 11 in accordance with the invention.

The authentication server 11 includes a processor 111 and a computer memory 113 coupled to the processor.

The authentication server 11 also includes a communication module 115 which communicates through the Internet or other communication network to transmit and receive data. The communication module 115 is configured to communicate with other devices, and to initiate interactive communication sessions between other devices, such as between a client device 13 and an authorization server 19.

A user authenticator 1111 executes on the processor 111. When the user authenticator 1111 receives a client identifier parameter value from a client device 13, it requests that the communication module 115 retrieve a corresponding client identifier parameter value from a data storage system 15. The user authenticator 1111 compares these values, and actuates the communication module 115 to initiate an interactive communication session responsive to the comparison. The user authenticator 1111 then deletes all versions of the client identifier parameter value from the computer memory 113.

An encryption module 1113 preferably also executes on the processor 111. It is preferable that the client identifier parameter value retrieved from the data storage system 15 be in an encrypted form until received on the authentication server 11, whereupon the encryption module 1113 decrypts the value using a decryption key stored in the memory 113 of the authentication server 11, and preferably exclusively stored in a secure portion thereof. The decryption key is preferably the private key of a public-private key pair for the authentication server 11. In various implementations, the encryption module 1113 also encrypts and decrypts other data, and verifies signatures, using the server's exclusive decryption key as well as other encryption and decryption keys.

A storage request module 1115 preferably also executes on the processor 111. The storage request module 1115 compiles data and transmits it through the communication module 115 to the data storage system 15, along with a request that the data be stored in the data storage system 15 at a particular index or address, or managed by a smart contract at a particular index or address. For example, the storage request module 1115 is configured to take a client identifier parameter value encrypted by the encryption module 1113 and request that it be stored in the data storage system 15.

In the illustrated embodiment, an identifier allocator 1117 also executes on the processor 111, and generates client identifier parameter values to be associated with users seeking registration with the authentication server 11. These values are transmitted to a client device 13 of the user through the communication module 115. However, in alternate embodiments, this client identifier allocator is part of an authorization server 19 such as shown in FIG. 1A, which is in communication with the authentication server 11 through the communication module 115 and provides the client identifier parameter thereto, to be passed on to the client device 13.

4. Process Embodiments

A general flow of processes for client registration by an authentication server, in accordance with an exemplary embodiment of the present invention, will now be described with reference to FIG. 2.

At block 201, a public-private key pair ($C_{pub}$, $C_{priv}$) is generated for the client. If the client already has a suitable public-private key pair, this operation may be skipped. This key pair is preferably generated directly on the client device.

At block 203, the client requests and receives the authentication server's public key ($S_{pub}$). Other data for the server may also be requested at this time, including but not limited to a server status (SStatus).

Optionally, at block 205, the client validates the authentication server, checking to confirm that the server is legitimate and presently functioning according to the system's protocols. In various embodiments, this is done by checking the server status SStatus or other data received from the authentication server, querying the data storage system for registrar-specific data, or both. Details of at least one embodiment of registration functions of the server registrar will be described further herein.

If the authentication server is not legitimate or functional within the system, the process ends without registering the client. If the server is legitimate, the process continues to block 207.

At block 207, the client requests registration on the authentication server. Preferably, the client sends the client public key ($C_{pub}$) to the server as part of the request. The request may also include other data, including a timestamp (T1), a randomly generated nonce (N1), and/or a signature formed by encrypting all other data in the request using the client's private key $C_{priv}$. The request as a whole is preferably encrypted using the server's public key $S_{pub}$. Therefore, in an example embodiment, the request takes the form $S_{pub}(C_{pub}, T1, N1, C_{priv}(C_{pub}, T1, N1))$.

At block 209, the authentication server confirms that the client request is valid. In various embodiments, this includes one or more of: confirming that T1 is valid, verifying the signature against the rest of the request, and confirming that the client is not already registered for the server. The last confirmation preferably includes accessing the data storage system to determine if a record (for example, a transaction in the blockchain) exists in association with the authentication server and the client's shared index ($S_{pub}+C_{pub}$). The server also, in some embodiments, maintains its own list of registered clients.

If the client request is not valid, the process ends without registering the client. If the client request is valid, the process continues to block 211.

At block 211, a client identifier (CID) is selected. The identifier is preferably unique with respect to the authentication server; that is, no other user uses the same client identifier CID with respect to the authentication server. It is preferable that the client identifier CID be generated as part of this process, although it is within the scope of the invention that an existing identifier for the client or user be selected instead. In certain embodiments, this identifier is generated by the authentication server, but in alternate embodiments, it is generated on the secure server itself.

At block 213, the authentication server sends a request to the client for a "client handle," which will be described further herein. This request contains the client identifier CID. The request may also include other data, including a timestamp (T2), the nonce N1 earlier transmitted by the client (in embodiments where one exists), a different randomly generated nonce (N2), and/or a signature formed by encrypting all other data in the request using the authentication server's private key $S_{priv}$. The request as a whole is preferably encrypted using the client's public key $C_{pub}$. Therefore, in an example embodiment, the request takes the form $C_{pub}$ (CID, T2, N1, N2, $S_{priv}$(CID, T2, N1, N2)).

At block 215, the client confirms that the server request is valid. In various embodiments, this includes one or more of: confirming the timestamp T2 is valid, confirming the same nonce N1 that was transmitted earlier has been returned, and verifying the signature.

If the server request is not valid, the process ends without registering the client. If the server request is valid, the process continues to block 217.

At block 217, the client generates a client handle (CH). The handle CH contains the client identifier CID, and preferably also contains a signature which encrypts the client identifier CID using the client's private key $C_{priv}$. The signature preferably further encrypts the authentication server's public key $S_{pub}$, in order to make the signature unique to the client-server combination. The handle itself is encrypted using the client's public key $C_{pub}$. In summary, a preferred form of the client handle CH is $C_{pub}$ (CID, $C_{priv}$($S_{pub}$, CID)). It is noted that this client handle is associated with the client-server combination, and is in a form readable exclusively by the client device, and not the server, due to the encryption.

At block 219, the client transmits the client handle CH to the authentication server. The transmission may also include other data, including a timestamp (T3), the nonce N2 earlier transmitted by the server (if any), contact information (UContact) for the user in possession of the client device (such as an email address or phone number), and/or a signature formed by encrypting all other data in the transmission using the client's private key $C_{priv}$. The request as a whole is preferably encrypted using the server's public key $S_{pub}$. In summary, a preferred form of the client handle transmission is $S_{pub}(C_{pub}(CID, C_{priv}(S_{pub}, CID)), T3, N2, UContact, C_{priv}(C_{pub}(CID, C_{priv}(S_{pub}, CID)), T3, N2, UContact))$, or $S_{pub}$ (CH, T3, N2, UContact, $C_{priv}$(CH, T3, N2, UContact)), At block 221, the authentication server confirms that the client's transmission is valid. In various embodiments, this includes one or more of: confirming the timestamp T3 is valid, confirming the same nonce N2 that was transmitted earlier has been returned, and verifying the signature. It is noted that the server does not have the client's private key $C_{priv}$ and therefore cannot determine the contents of CH, but instead treats it as a unique but indecipherable piece of data.

If the transmission is not valid, the process ends without registering the client. If the transmission is valid, the process continues to block 223.

Optionally, at block 223, if contact information UContact was provided with the client handle CH, the authentication server sends a request for verification to the contact information, for example an email or text message. The server then waits for a verification response from the user.

At block 225, the authentication server generates a server handle which is specifically associated with the client (SH). The handle SH contains the client identifier CID, and preferably also contains a client permission level (CPermission) which defines the authorized level of secure server access granted to the client, the user contact information UContact, and a signature formed by encrypting all other data in the handle using the server's private key $S_{priv}$. The signature preferably further encrypts the client's public key $C_{pub}$, in order to make the signature unique to the client-server combination. The handle SH itself is encrypted using the server's public key $S_{pub}$. In summary, a preferred form of the server handle SH is $S_{pub}$ (CID, CPermission, UContact, $S_{priv}(C_{pub}$, CID, CPermission, UContact)). It is noted that this server handle is associated with the client-server combination, and is in a form readable exclusively by the authentication server (or servers, in a system with multiple related servers sharing the same key pair) due to the encryption.

At block 227, the authentication server requests that the data storage system generate a record (for example, a transaction on the blockchain) with reference to the shared index $S_{pub}+C_{pub}$ for the server and client. The record request includes the server and client public keys $S_{pub}$, $C_{pub}$, and the server and client handles SH, CH. Due to the shared index $S_{pub}+C_{pub}$, the record will be associated with the client device and the authentication server in combination.

At block 229, the handles SH, CH are written to the record at $S_{pub}+C_{pub}$. It is noted that this is the only point in the process that data is written to the data storage system. It is also noted that the data storage system does not have access to either private key and therefore cannot determine the contents of either handle being stored.

It is further noted that a smart contract approach of any suitable type known in the art may be implemented here in certain embodiments. As described previously, various suitable types of smart contract implementations are known in the art, each with differing approach to data handling, and suitable measures for storage and access of both the smart contract and the registration data will be apparent to those of skill in the art. For example, in accordance with certain embodiments, a smart contract may be generated for the client and server, which contains pointers to storage locations where the handles, and other registration data, are or are to be stored. The smart contract, or an address where the smart contract is stored, may then be written to the record (that is, as part of a transaction written to a block), and the handles and other registration data written to the appropriate storage locations using the smart contract. Both the smart contract and the data manipulated by the smart contract may be stored in any suitable location in various implementations and applications, either in the data storage system or elsewhere, so long as it remains consistently accessible and secure.

At block 231, the authentication server receives verification that the record was generated. If the server originally received the client identifier CID from an outside authorization server, it notifies the authorization server that the identifier was used, and the authorization server is thereby instructed not to reuse it. If the server maintains its own list of registered clients, it adds the new client to the list at this time. The server then deletes both handles SH, CH and the client identifier CID from its own storage.

At block 233, the client receives verification that the record was generated. The client stores the server's public key $S_{pub}$ and a direct access address (such as a URL or IP address) for the server, so that this information may be referenced for later access to the server. The client then deletes the client handle CH and the client identifier CID from its storage. The process then ends.

It is noted that, at this point, the client identifier CID only exists in the system on the data storage system. Specifically, the client identifier CID exists on the data storage system in two forms: as part of the client handle CH, which can only be decrypted using the client private key $C_{priv}$, and as part of the server handle SH, which can only be decrypted using the server private key $S_{priv}$. As such, only the client, which is in exclusive possession of the client private key $C_{priv}$, can read the client handle CH, and only the server, which is in exclusive possession of the server private key $S_{priv}$, can read the server handle SH.

Once registration is complete, the client identifier CID is uniquely associated with the user who owns the client device for use in authenticating the user, as will be made clear with respect to FIG. 3 below. In certain embodiments, the client identifier CID is also uniquely associated with the client device itself, but this is not the case in other embodiments, as will be made clear with respect to FIG. 4 below.

This process preferably occurs automatically the first time a client attempts to register in relation to a secure server which uses the authentication server for authentication. It is noted that provision of the contact information UContact for block 219, and process verification with the user through UContact at block 223, are the only times that the user of the device acts directly. All other data necessary to the above process can be generated automatically once registration is initiated.

It is also noted that, in implementations where the authentication server provides authentication for multiple secure servers, a single registration preferably provides basic access to all secure servers. Separate permissions for each secure server are preferably enabled in such implementations. Additionally, in certain such implementations, the authentication server stores multiple key pairs, one generated for each secure server or grouping of secure servers, and generates separate server handles, smart contracts, and other registration data for each key.

In certain implementations, an entire user profile is desired. The user profile includes the contact information UContact, and also other data including but not limited to a name, mailing address, photograph or image, and/or financial information for placing orders. Preferably, this data is provided along with the contact information UContact, at block 219. In some embodiments, the data is included in the server handle SH in the same manner as the contact information UContact, at block 225, while in other embodiments, at least some of the data, including but not limited to the contact information UContact, is stored separate from the server handle.

In an embodiment where the data storage system is a blockchain network, an account having numerous data elements, many of which are frequently amended by users (such as the data elements of a user profile), can introduce the need to store the entire current state of the account to multiple transactions in rapid succession. This is inefficient, and therefore a smart contract approach is preferred when an entire user profile or a similar number of amendable data elements are implemented. For reasons described previously, a suitable smart contract implementation obviates the need to store all data for the account to the blockchain each time any element of the data is amended. Preferably in such embodiments, at least the contact information UContact and the user profile data elements are managed by the smart contract. Additionally, in at least some embodiments, the permission CPermission is also stored somewhere other than within the server handle SH and is managed by the smart contract. Furthermore, in at least some embodiments, storage and retrieval of the handles SH, CH themselves are also managed by the smart contract.

However, for convenience of description, it will be assumed going forward that all data being stored to or retrieved from a blockchain-based data storage system is stored directly to the blockchain, unless specified otherwise.

A general flow of processes for client authentication through an authentication server, in accordance with an exemplary embodiment of the present invention, will now be described with reference to FIG. 3.

Optionally, at block 301, the client validates the authentication server, checking to confirm that the server is still legitimate and presently functioning according to the system's protocols. In certain embodiments, this is done by querying the data storage system for records generated by the server registrar.

If the authentication server is not legitimate or functional within the system, the process ends without authenticating the client. If the server is legitimate, the process continues to block 303.

At block 303, the client accesses the data storage system to retrieve the client handle CH for the client-server combination, which is stored in the record located at their shared index $S_{pub}+C_{pub}$. The client decrypts the client handle CH using its private key $C_{priv}$.

At block 305, the client verifies the signature within the handle CH, which as noted previously is preferably generated by encrypting the client identifier CID and the server public key $S_{pub}$ with the client private key $C_{priv}$. This confirms that the client identifier CID in CH has not been tampered with (for example, by replacing CH with a false CH containing a different CID, by someone who does not have access to $C_{priv}$ and therefore cannot generate the signature). This also confirms that the handle CH is the correct one for the authentication server or servers associated with $S_{pub}$.

If the client handle CH appears to have been tampered with, the process ends without authenticating the client. Preferably, an alert is provided to the authentication server and/or the data storage system that the record in question has been potentially compromised. If the client handle CH is verified, the process continues to block 307.

At block 307, the client sends an authentication or login request to the authentication server. This request contains the client identifier CID. The request may also include other data, including a timestamp T1, a nonce N1, the client public key $C_{pub}$, and/or a signature formed by encrypting all other data in the request using the client's private key $C_{priv}$. The request as a whole is preferably encrypted using the server's public key $S_{pub}$. Therefore, in an example embodiment, the request takes the form $S_{pub}$ (CID, $C_{pub}$, T1, N1, $C_{priv}$(CID, $C_{pub}$, T1, N1)).

At block 309, the authentication server confirms that the authentication request is valid. In various embodiments, this includes one or more of: confirming the timestamp T1 is valid, and verifying the signature.

If the authentication request is not valid, the process ends without authenticating the client. If the authentication request is valid, the process continues to 311.

At block 311, the authentication server accesses the data storage system to retrieve the server handle SH for the client-server combination, which is stored in the record located at the server and client's shared index $S_{pub}+C_{pub}$. The server decrypts the server handle SH using its private key $S_{priv}$.

At block 313, the authentication server confirms that the server handle SH is untampered with and matches the authentication request. In particular, the server checks the client identifier CID in the server handle SH against the client identifier CID in the authentication request. In a preferable embodiment, this confirms that the client was in possession of the client's private key $C_{priv}$, and was therefore able to read the client identifier CID out of the corresponding client handle CH. In various embodiments, this confirmation also includes one or more of: checking the permission level CPermission in the server handle SH, and verifying the signature.

If the server handle SH does not match the authentication request, or the handle SH has been tampered with, the process ends without authenticating the client. Preferably, an alert is provided to the data storage system that the record in question has been potentially compromised. Otherwise, the process continues to block 315.

Optionally, at block 315, if contact information was provided with the server handle SH, the authentication server sends a request for verification to the contact information, for example an email or text message. The server then waits for a verification response from the user.

Preferably, at block 317, the authentication server sends a challenge message to the client, in order to ensure that a prior authentication request of the client has not been reused by an imposter. The challenge includes a nonce N2, and may also include other data including the nonce N1 earlier transmitted by the client (if any), a timestamp T2, and/or a signature formed by encrypting all other data in the request using the server's private key $S_{priv}$. The challenge as a whole is preferably encrypted using the client's public key $C_{pub}$.

At block 319, the client confirms that the challenge is valid. In various embodiments, this includes one or more of: confirming the timestamp T2 is valid, confirming that the same nonce N1 that was transmitted earlier has been returned, and verifying the signature.

If the challenge is not valid, the process ends without authenticating the client. If the challenge is valid, the process continues to block 321.

At block 321, the client sends a challenge response to the authentication server. This response includes the nonce N2 sent by the server, and may also include other data including a timestamp T3, and/or a signature formed by encrypting all other data in the request using the client's private key $C_{priv}$. The response is as a whole preferably encrypted using the authentication server's public key $S_{pub}$.

At block 323, the authentication server confirms that the response is valid. In particular, the server checks that the nonce N2 sent in the challenge has been returned. This confirms that the client is in current possession of the client's private key $C_{priv}$, and was therefore able to read the nonce N2 from the challenge message. In various embodiments, this confirmation also includes one or more of: confirming the timestamp T3 is valid, and verifying the signature.

If the response is not valid, the process ends without authenticating the client. If the response is valid, the process continues to block 325.

At block 325, the authentication server initiates an interactive communication session between the secure (authorization) server and the client device, providing the client with a level of access to the secure server's functions reflective of the permission level CPermission in the server handle SH. Now that the client is authenticated, and the session correspondingly approved and initiated, the secure server manages the session going forward and the authentication server need not be involved further.

At blocks 327 and 329, with the communication session initiated, both the client and the authentication server delete the client identifier CID and their respective handles CH, SH. Once again, at this point, the client identifier CID only exists in the system on the data storage system, and only in encrypted forms which the data storage system cannot itself decrypt. The process then ends.

It is also noted that it was not necessary to write new data to the data storage system at any point in this process, but merely to read from the storage. If the data storage system is a blockchain network, this arrangement avoids the high processing cost of adding a transaction to a blockchain.

In the above processes, the permission to access the secure server is granted to a client device. In practice, a user with permission to access particular aspects of the secure server may use more than one client device. It is therefore preferable in certain embodiments to associate client devices, such that a user can access the secure server using any of these client devices and be authenticated as the same user in all cases.

Figure 4:
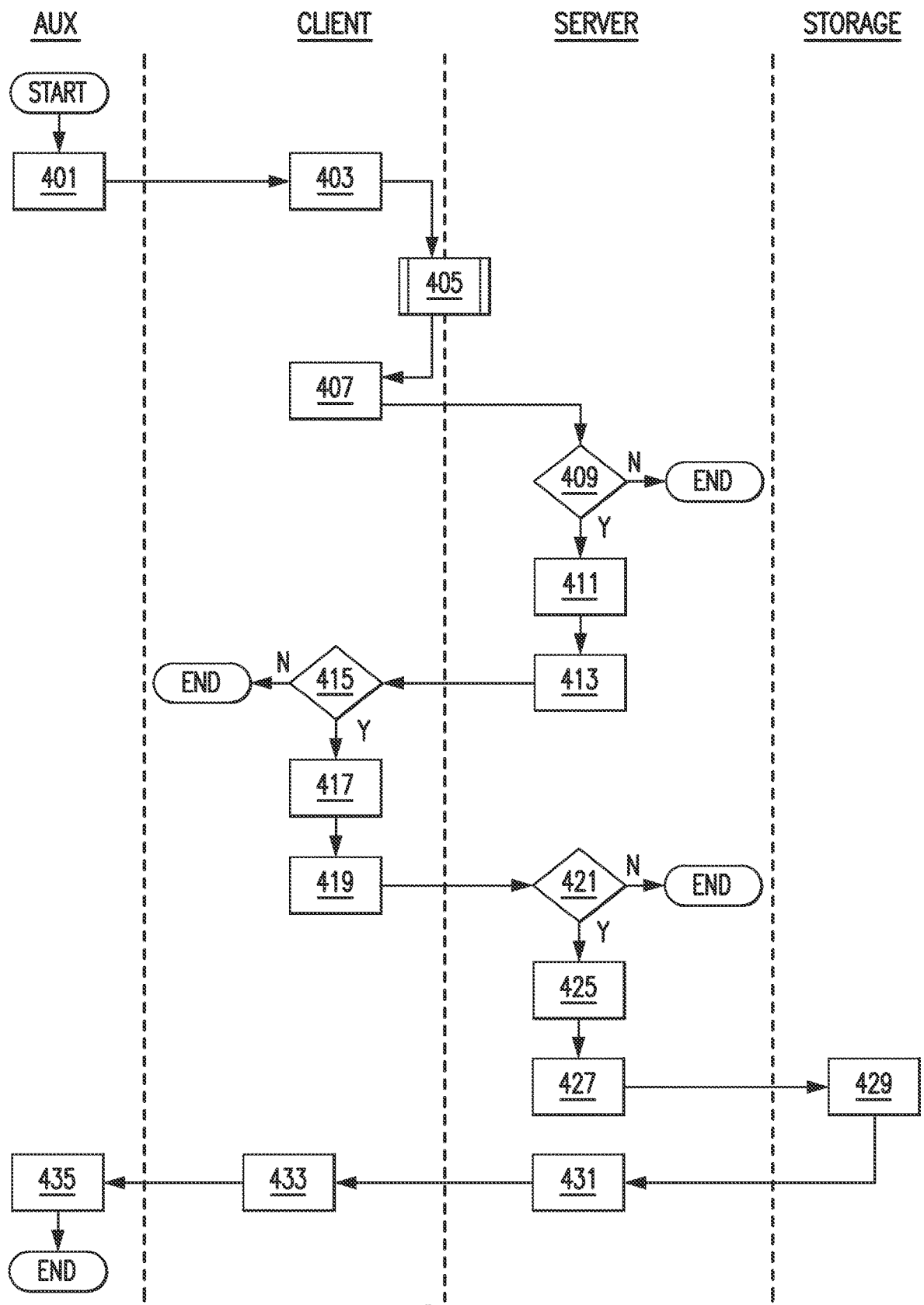
FIG. 4 is a flow diagram illustrating a flow of processes for associating a presently-unregistered client device with a previously-registered client device, in accordance with an exemplary embodiment of the present invention.

A general flow of processes for associating a presently-unregistered client device (hereinafter, the "auxiliary client") with a previously-registered client device (hereinafter, the "primary client"), in accordance with an exemplary embodiment of the present invention, will now be described with reference to FIG. 4.

At block 401, a public-private key pair ($A_{pub}$, $A_{priv}$) is generated for the auxiliary client. If the auxiliary client already has a public-private key pair, this operation may be skipped. The auxiliary device is illustrated to generate these keys in FIG. 4, but in an alternate embodiment, the keys are generated by the primary client. If the auxiliary key pair is not on the primary device already, it is transmitted there by a suitable secure transmission, such as encrypting the transmission with the primary client's public key, using a secure transfer service, or using a physical transfer by hardware dongle. Other suitable secure transmission methods are well known in the art and will not be elaborated on herein.

At block 403, the primary client requests and receives the server's public key ($S_{pub}$). Other data for the server may also be requested at this time, including but not limited to a server status (SStatus).

Figure 3:
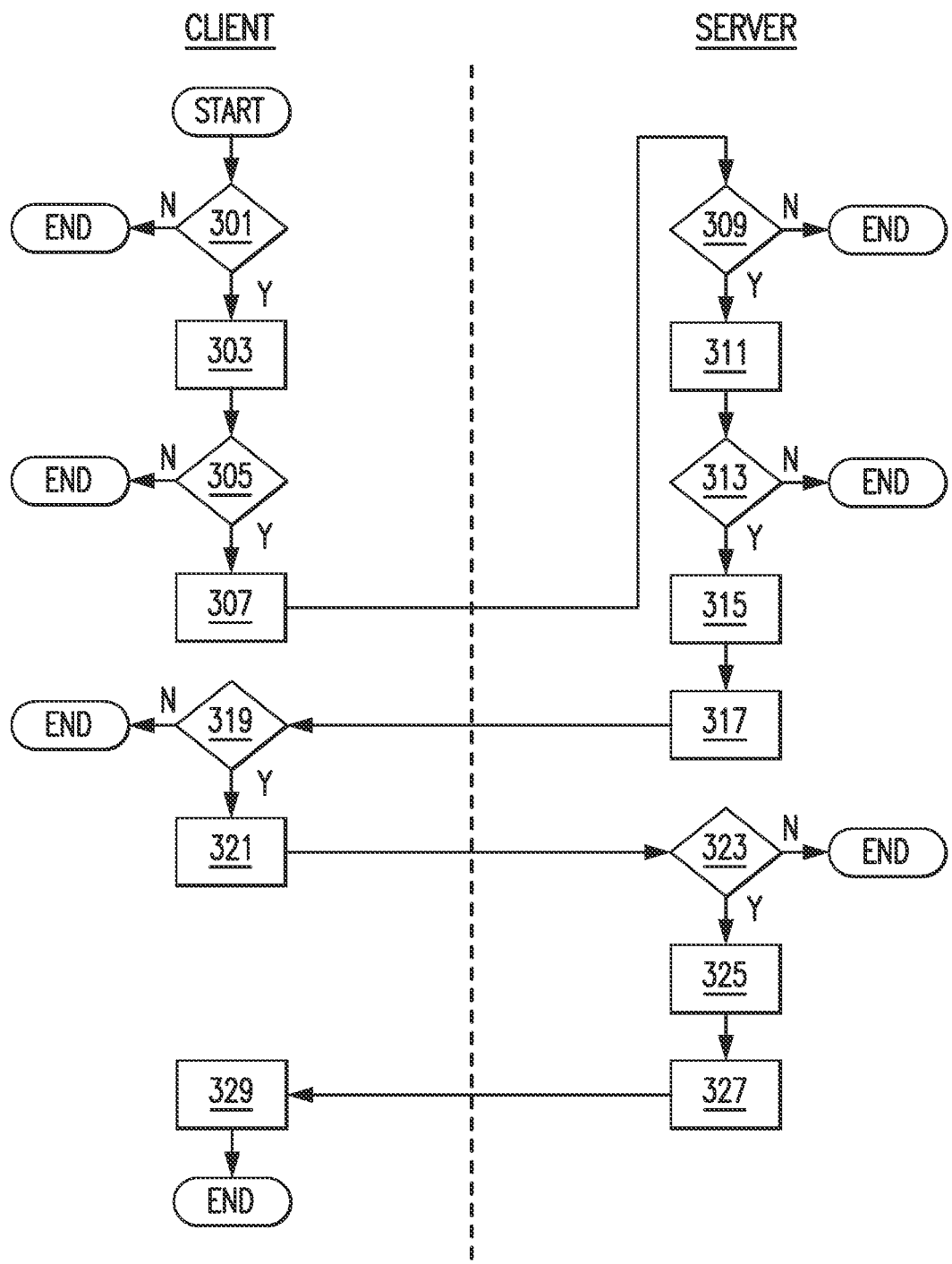
FIG. 3 is a flow diagram illustrating a flow of processes for client authentication, in accordance with an exemplary embodiment of the present invention.

At block 405, the primary client is authenticated, for example as disclosed with respect to FIG. 3. However, the process is interrupted before the client identifier CID is deleted from either the primary client or the authentication server. The contact information (UContact) and client permission level CPermission are also preferably maintained on the authentication server.

At block 407, the primary client requests registration of the auxiliary client on the authentication server. Preferably, the primary client sends the auxiliary public key ($A_{pub}$) to the authentication server as part of the request. The request may also include other data, including a timestamp (T1), a randomly generated nonce (N1), additional user contact information specific to the auxiliary device (AContact), and/or at least one signature formed by encrypting all other data in the request using the primary client's private key $C_{priv}$ or auxiliary client's private key $A_{priv}$. Preferably the request includes two signatures, one encrypted with $C_{priv}$ and one encrypted with $A_{priv}$, to demonstrate that the user of the primary client is authorized to use both devices. The request as a whole is preferably encrypted using the server's public key $S_{pub}$. Therefore, in an example embodiment, the request takes the form $S_{pub}$ ($A_{pub}$, T1, N1, AContact, $C_{priv}$ ($A_{pub}$, T1, N1, AContact), $A_{priv}$($A_{pub}$, T1, N1, AContact)).

At block 409, the authentication server confirms that the client request is valid. In various embodiments, this includes one or more of: confirming that the primary client has permission to add auxiliary clients (which is preferably stated as part of the client permission level CPermission, preserved on the authentication server from the authentication process of block 405), confirming that T1 is valid, verifying the signature(s) against the rest of the request, and confirming that the auxiliary client is not already registered for the server. The last confirmation preferably includes accessing the data storage system to determine if a record (for example, a transaction in the blockchain) exists in association with the authentication server and auxiliary client's shared index ($S_{pub}$+$A_{pub}$). The authentication server also, in some embodiments, maintains its own list of registered clients, including auxiliary clients.

If the client request is not valid, the process ends without registering the auxiliary client. If the client request is valid, the process continues to block 411.

Optionally, at block 411, if contact information UContact was preserved from the authentication process 405, the authentication server sends a request for verification to the contact information, for example an email or text message. The server then waits for a verification response from the user.

At block 413, the authentication server sends a request to the primary client for an auxiliary client handle. The request includes a different randomly generated nonce N2, and may also include other data including the nonce N1 earlier transmitted by the primary client (if any), a timestamp T2, and/or a signature formed by encrypting all other data in the request using the server's private key $S_{priv}$. The request as a whole is preferably encrypted using the primary client's public key $C_{pub}$. Therefore, in an example embodiment, the request takes the form $C_{pub}$ (T2, N1, N2, $S_{priv}$(T2, N1, N2)).

At block 415, the primary client confirms that the request is valid. In various embodiments, this includes one or more of: confirming the timestamp T2 is valid, confirming the same nonce N1 that was transmitted earlier has been returned, and verifying the signature.

If the request is not valid, the process ends without registering the auxiliary client. If the request is valid, the process continues to block 417.

At block 417, the primary client generates an auxiliary client handle (ACH). The auxiliary handle ACH contains the client identifier CID, and preferably also contains a signature which encrypts the client identifier CID using the auxiliary client's private key $A_{priv}$. The signature preferably further encrypts the server's public key $S_{pub}$, in order to make the signature unique to the client-server combination. The handle itself is encrypted using the auxiliary client's public key $A_{pub}$. In summary, a preferred form of the client handle CH is $A_{pub}$ (CID, $A_{priv}$($S_{pub}$, CID)). It is noted that this auxiliary client handle is associated with the auxiliary client-server combination, and is in a form readable by the auxiliary client device, and not the server, due to the encryption.

At block 419, the client transmits the auxiliary client handle ACH to the authentication server. The transmission may also include other data, including a timestamp (T3), the nonce N2 earlier transmitted by the server (if any), and/or a signature formed by encrypting all other data in the request using the auxiliary client's private key $A_{priv}$. The response is as a whole preferably encrypted using the server's public key $S_{pub}$. In summary, a preferred form of the auxiliary client handle transmission is $S_{pub}$ ($A_{pub}$ (CID, $A_{priv}$($S_{pub}$, CID)), T3, N2, $A_{priv}$($A_{pub}$(CID, $A_{priv}$($S_{pub}$, CID)), T3, N2)), or $S_{pub}$(ACH, T3, N2, $A_{priv}$(ACH, T3, N2)), At block 421, the authentication server confirms that the transmission is valid. In various embodiments, this includes one or more of: confirming the timestamp T3 is valid, confirming the same nonce N2 that was transmitted earlier has been returned, and verifying the signature. It is noted that the server does not have the auxiliary client's private key $A_{priv}$ and therefore cannot determine the contents of ACH, but instead treats it as a unique but indecipherable piece of data.

If the transmission is not valid, the process ends without registering the auxiliary client. If the transmission is valid, the process continues to block 425.

At block 425, the authentication server generates a second server handle which is specifically associated with the auxiliary client (ASH). The handle ASH contains the client identifier CID, and preferably also contains an auxiliary client permission level (APermission) which defines the authorized level of secure server access granted to the auxiliary client, the auxiliary user contact information AContact, and a signature which encrypts the client identifier CID using the server's private key. The signature preferably further encrypts the auxiliary client's public key $A_{pub}$, in order to make the signature unique to the auxiliary client-server combination, and may also encrypt the other elements of the handle. The handle ASH itself is encrypted using the server's public key $S_{pub}$. In summary, a preferred form of the server handle ASH is $S_{pub}$ (CID, APermission, AContact, $S_{priv}$($A_{pub}$, CID, APermission, AContact)). It is here noted that this auxiliary server handle is associated with the combination of the auxiliary client and the server, not the primary client and the server.

At block 427, the authentication server requests that the data storage system generate a record (for example, a transaction on the blockchain) with reference to the shared index at the shared index $S_{pub}+A_{pub}$ for the server and auxiliary client. The record request includes the server and auxiliary client public keys $S_{pub}$, $A_{pub}$, and the server and auxiliary client handles ASH, ACH. Due to the shared index $S_{pub}+A_{pub}$, the record will be associated with the auxiliary client device and the authentication server in combination.

At block 429, the handles ASH, ACH are written to the record at $S_{pub}+A_{pub}$. It is noted that this is the only point in the process that data is written to the data storage system. It is also noted that the data storage system does not have access to either private key and therefore cannot determine the contents of either handle being stored.

It is further noted that a smart contract approach is preferably applied here in certain embodiments. As described previously, both generally and with respect to FIG. 2, any suitable implementation of a smart contract may be suitably used to store some or all of the registration data, as well as the smart contract itself.

At block 431, the authentication server receives verification that the record was generated. If the server maintains its own list of registered clients which includes auxiliary clients, it adds the new auxiliary client to the list at this time. The server then deletes both handles ASH, ACH and the client identifier CID from its own storage.

At block 433, the primary client receives verification that the record was generated. The primary client then forwards this information to the auxiliary client. The auxiliary client public and private keys $A_{pub}$, $A_{priv}$ are also transmitted, preferably in a suitable secure transmission known in the art such as physical transfer by hardware dongle, if they were not generated by the auxiliary client. The primary client then deletes the auxiliary client handle ACH and the client identifier CID from its storage. In some embodiments, the primary client also deletes the auxiliary client's private key $A_{priv}$ at this point. If so, the auxiliary client handle ACH stored in the record is no longer readable by the primary client device, but only the auxiliary client device.

At block 435, the auxiliary client receives verification that the record was generated. The auxiliary client stores the server's public key $S_{pub}$ and a direct access address (such as a URL or IP address) for the server, so that this information may be referenced for later access to the server. The process then ends.

It is noted that, if desired during a later authentication process, the authentication server can verify that the two clients are the same user because the handles SH and ASH contain the same CID. As such, an authentication request from the auxiliary client (for example, as transmitted at block 307 in the process of FIG. 3) can include both the auxiliary client's public key $A_{pub}$ and the primary client's public key $C_{pub}$. The server can then access both SH and ASH from the respective indices on the data storage system to confirm the shared identity of the user of the client devices. The authentication server can also provide the same permission levels to both the primary and auxiliary clients. However, in some implementations this is not desirable, and therefore the auxiliary permission APermission is used instead.

It may be desirable for a client's registration to be deactivated—that is, for the client's access to the server to be terminated.

A general flow of processes for client deregistration or client deactivation initiated by a client, in accordance with an exemplary embodiment of the present invention, will now be described with reference to FIG. 5.

At block 501, the client accesses the data storage system to retrieve the client handle CH for the client-server combination, which is stored in the record located at their shared index $S_{pub}+C_{pub}$. The client decrypts the client handle CH using its private key $C_{priv}$.

At block 503, the client verifies the signature within the handle CH, which as noted previously is preferably generated by encrypting the client identifier CID and the server public key $S_{pub}$ with the client private key $C_{priv}$. This confirms that the client identifier CID in CH has not been tampered with (for example, by replacing CH with a false CH containing a different CID, by someone who does not have access to $C_{priv}$ and therefore cannot generate the signature). This also confirms that the handle CH is the correct one for the authentication server associated with $S_{pub}$.

If the client handle CH appears to have been tampered with, the process ends without deregistering the client. Preferably, an alert is provided to the authentication server and/or the data storage system that the record in question has been potentially compromised. If the client handle CH is verified, the process continues to block 307.

At block 505, the client sends a deregistration request to the authentication server. This request contains the client identifier CID. The request may also include other data, including a timestamp T1, the client public key $C_{pub}$, and/or a signature formed by encrypting all other data in the request using the client's private key $C_{priv}$. The request as a whole is preferably encrypted using the authentication server's public key $S_{pub}$.

At block 507, the authentication server confirms that the deregistration request is valid. In various embodiments, this includes one or more of: confirming the timestamp T1 is valid, and verifying the signature.

If the deregistration request is not valid, the process ends without deregistering the client. If the deregistration request is legitimate, the process continues to 509.

At block 509, the authentication server accesses the data storage system to retrieve the server handle SH and the client handle CH for the client-server combination, which are both stored in the record located at the server and client's shared index $S_{pub}+C_{pub}$. The server decrypts the server handle SH using its private key $S_{priv}$. The client handle CH is stored on the server, without decryption, for later placement in a new transaction. In some embodiments where a smart contract is implemented, it is not necessary to retrieve the client handle CH, as will be explained further below.

Optionally, at block 511, if contact information was provided in the server handle SH, the authentication server sends a request for verification to the contact information, for example an email or text message. The server then waits for a verification response from the user.

At block 513, the authentication server confirms that the server handle SH is untampered with and matches the deregistration request. In particular, the server checks the client identifier CID in the server handle SH against the client identifier CID in the deregistration request. This confirms that the client was in possession of the client's private key $C_{priv}$, and was therefore able to read the client identifier CID out of the corresponding client handle CH. In various embodiments, this confirmation also includes one or more of: checking the permission level CPermission in the server handle SH, and verifying the signature. In particular, if CPermission already describes the client as deregistered or "inactive," the remainder of the process is unnecessary.

If the server handle SH does not match the deregistration request or the handle SH has been tampered with, the process ends without deregistering the client. Otherwise, the process continues to block 515.

At block 515, the authentication server generates an amended server handle which is specifically associated with the client (SH'). The amended handle SH' contains the client identifier CID, and an amended client permission level (CPermission') which defines the client to have no authorization to access the server (that is, an "inactive" permission). The amended handle SH' preferably also contains the user contact information UContact, and a signature which encrypts the client identifier CID using the server's private key. The signature preferably further encrypts the client's public key $C_{pub}$, in order to make the signature unique to the client-server combination. The handle SH itself is encrypted using the server's public key $S_{pub}$. In summary, a preferred form of the amended server handle SH' is $S_{pub}$ (CID, CPermission', UContact, $S_{priv}(C_{pub}$, CID, CPermission', UContact)). It is noted that this amended server handle SH' includes, for each data element in the original server handle SH, either the same data element or an amended version thereof.

At block 517, the authentication server requests that the data storage system add the amended server handle SH' to the record at the shared index $S_{pub}+C_{pub}$ for the server and client. The record request includes the server and client public keys $S_{pub}$, $C_{pub}$, the amended server handle SH', and the client handle CH.

At block 519, the amended server handle SH' and the client handle CH are written to the record at $S_{pub}+C_{pub}$.

At block 521, the authentication server receives verification that the record was amended. The server then deletes the handles SH, SH', CH and the client identifier CID from its own storage.

At block 523, the client receives verification that the record was amended. Optionally, the client locally stores the information that it is no longer registered with the server. The process then ends.

It is noted that, in some embodiments, the permission CPermission is not included in the server handle SH, but is stored separately. In such embodiments, no amended server handle SH' is generated at block 515, and the amended permission CPermission' is written to the record along with the original server handle SH and client handle CH at block 519.

It is noted that, in the context of a blockchain network storing all data directly to a blockchain, block 519 generally requires that a new transaction, containing not only the amended server handle SH' (or amended permission CPermission') but all other data elements of the account, be written to the blockchain at the shared index $S_{pub}+C_{pub}$. This data is retrieved from elsewhere in the blockchain and assembled into the new transaction, despite not being relevant to the permission change. This is not an ideal use of processing resources in order to amend a permission status. As such, when the data storage system is a blockchain network or is similarly difficult to amend, it is preferable that a suitable smart contract is implemented which manages at least the permission CPermission and any requests for changes thereto. In this preferred embodiment, a smart contract is accessed at block 517, and is executed to change a stored permission at block 519. A new transaction is still written to the blockchain to reflect the change at block 519, but does not include all data for the account, but only account data which is not managed and stored using the smart contact. Indeed, it is not necessary in at least some of these embodiments to retrieve the client handle CH at block 509, if the client handle CH is stored by the smart contract and not on the blockchain, as the new transaction does not require inclusion of the client handle CH.

A general flow of processes for client deregistration or client deactivation initiated by an authentication server, in accordance with an exemplary embodiment of the present invention, will now be described with reference to FIG. 6.

At block 601, the authentication server accesses the data storage system to retrieve the server handle SH and the client handle CH for the client-server combination, which are both stored in the record located at the server and client's shared index $S_{pub}+C_{pub}$. The server decrypts the server handle SH using its private key $S_{priv}$. The client handle CH is stored on the server, without decryption, for later placement in a new transaction. In some embodiments where a smart contract is implemented, it is not necessary to retrieve the client handle CH, as will be explained further below.

At block 603, the authentication server confirms that the server handle SH is untampered with, and that the deregistration is necessary. In various embodiments, this confirmation includes one or more of: checking the permission level CPermission in the server handle SH, and verifying the signature. In particular, if CPermission already describes the client as deregistered or "inactive," the remainder of the process is unnecessary.

If the deregistration is not necessary or the server handle SH has been tampered with, the process ends without deregistering the client. Otherwise, the process continues to block 605.

At block 605, the authentication server generates an amended server handle which is specifically associated with the client (SH'). The amended handle SH' contains the client identifier CID (which was retrieved from the unamended server handle SH), and an amended client permission level (CPermission') which defines the client to have no authorization to access the server (that is, an "inactive" permission). The amended handle SH' preferably also contains the user contact information UContact, and a signature which encrypts the client identifier CID using the server's private key. The signature preferably further encrypts the client's public key $C_{pub}$, in order to make the signature unique to the client-server combination. The handle SH itself is encrypted using the server's public key $S_{pub}$. In summary, a preferred form of the amended server handle SH' is $S_{pub}$ (CID, CPermission', UContact, $S_{priv}(C_{pub}$, CID, CPermission', UContact)). It is noted that this amended server handle SH' includes, for each data element in the original server handle SH, either the same data element or an amended version thereof.

At block 607, the authentication server requests that the data storage system add the amended server handle SH' to the record at the shared index $S_{pub}+C_{pub}$ for the server and client. The record request includes the server and client public keys $S_{pub}$, $C_{pub}$, and the amended server and client handles SH', CH. At block 611, the amended handles SH', CH are written to the record at $S_{pub}+C_{pub}$.

At block 611, the authentication server receives verification that the record was amended. The server then deletes the handles SH, SH' and the client identifier CID from its own storage.

Optionally, at block 613, the client receives notice that the record was amended. Optionally, the client locally stores the information that it is no longer registered with the server. The process then ends.

Figure 5:
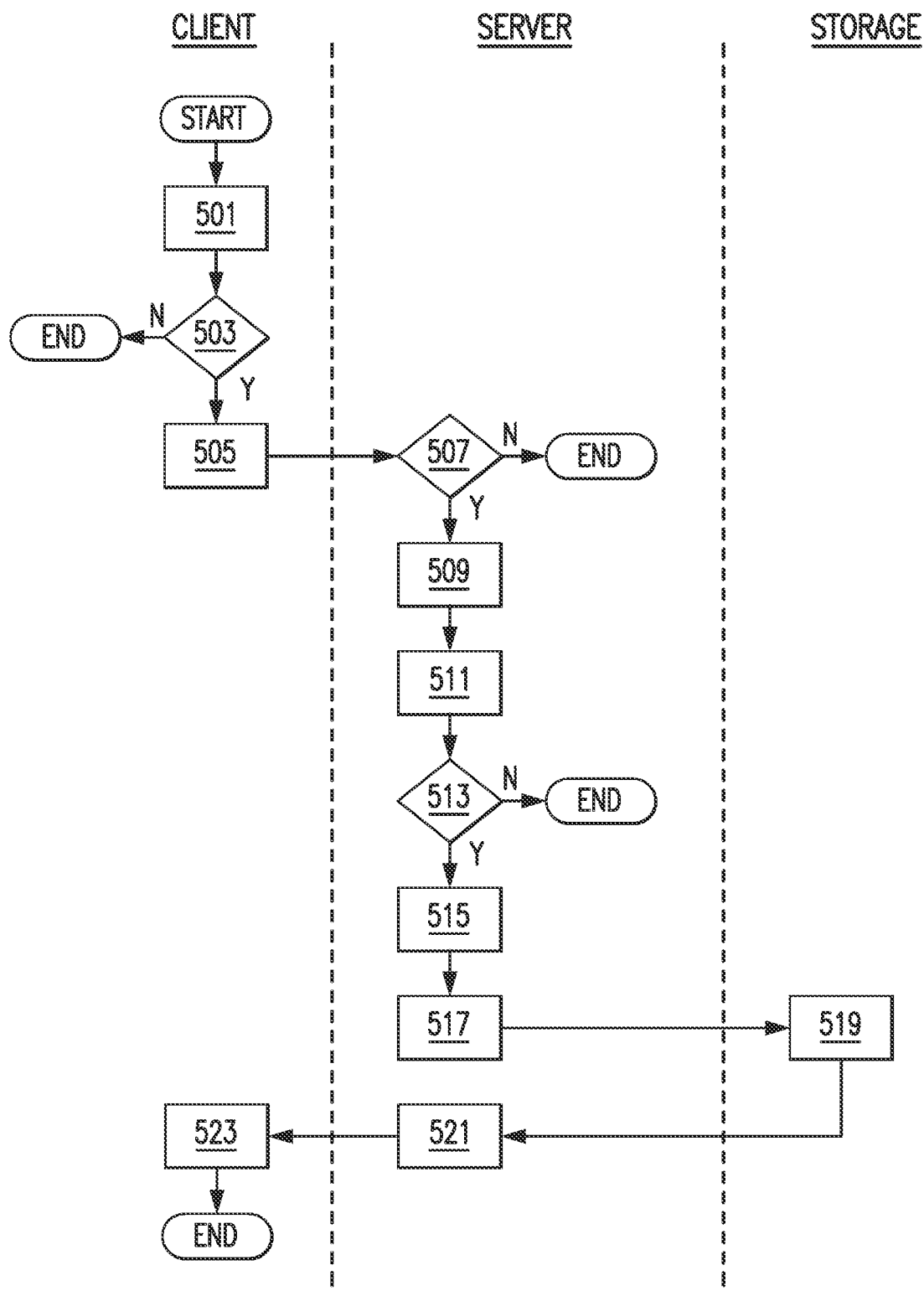
FIG. 5 is a flow diagram illustrating a flow of processes for client deregistration or client deactivation initiated by a client, in accordance with an exemplary embodiment of the present invention.

As noted with the process illustrated in FIG. 5, when the data storage system is a blockchain network or is similarly difficult to amend, it is preferable that a smart contract be accessed at block 607, and executed to change the permission indicated by the smart contract at block 609. Again, this obviates the need to write all data for the account to the new transaction at block 611, and in some embodiments further obviates the need to retrieve the client handle CH at block 601.

Figure 6:
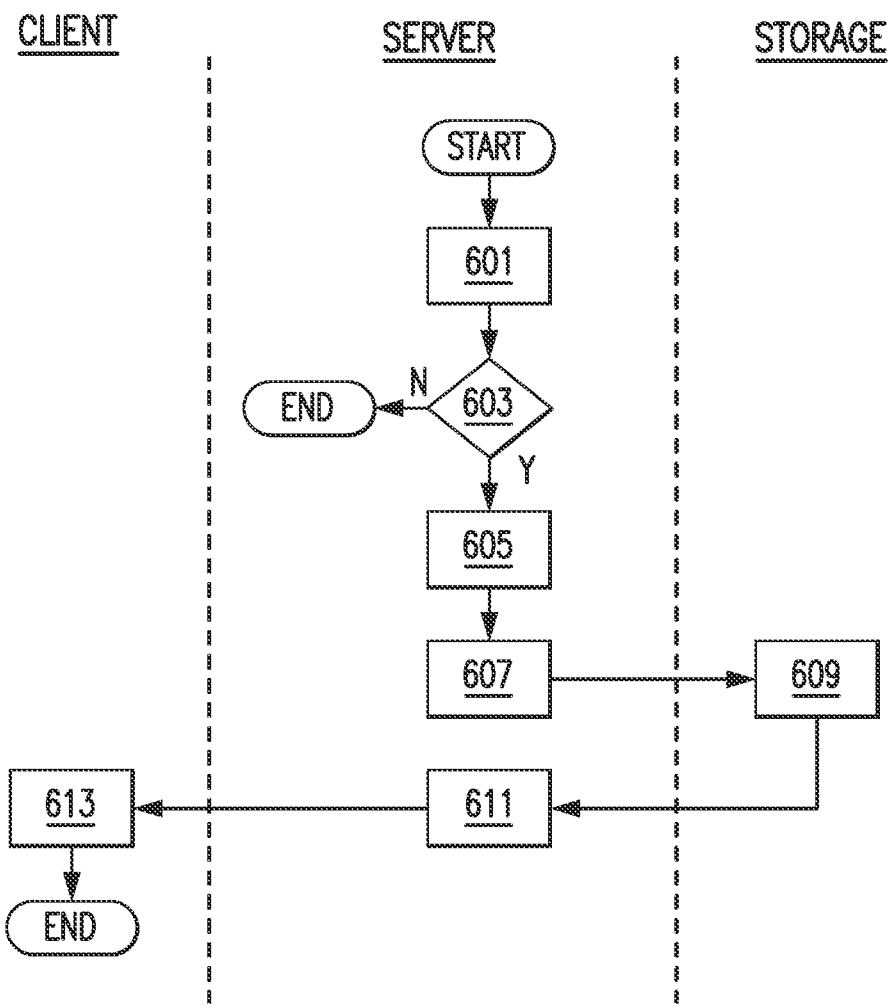
FIG. 6 is a flow diagram illustrating a flow of processes for client deregistration or client deactivation initiated by a server, in accordance with an exemplary embodiment of the present invention.

It is noted that the process illustrated in FIG. 6 can be modified to reactivate a deactivated account, or to set any other specific permission level for a client. (The same sort of modification is preferably not implemented for the process illustrated in FIG. 5, as this would enable a client to reactivate their own account when this might be undesirable.)

It is also noted that the process illustrated in FIG. 6 can be initiated by the secure server, in communication with the authentication server, in some implementations. Where authentication on multiple secure servers is managed by the authentication server, this is preferred, and allows each secure server to define and amend a respective permission level of a set of permission levels for each client or user.

It will be recognized by those of skill in the art that the processes illustrated in FIGS. 5 and 6 may be further modified to amend other aspects of a record in the data storage system. For example, the client's user contact information or other user profile data may be amended using the disclosed processes with only minor modification.

If it is desired that a secure server transition from an earlier authentication approach, such as a username and password login process, the new authentication process preferably occurs in the background for a given user when they log in using the earlier approach. If a user profile exists, it is preferably transferred with all data to be associated with the client device. In some implementations, this profile will conveniently supply the user contact information UContact without requiring the user to re-enter it.

Figure 7:
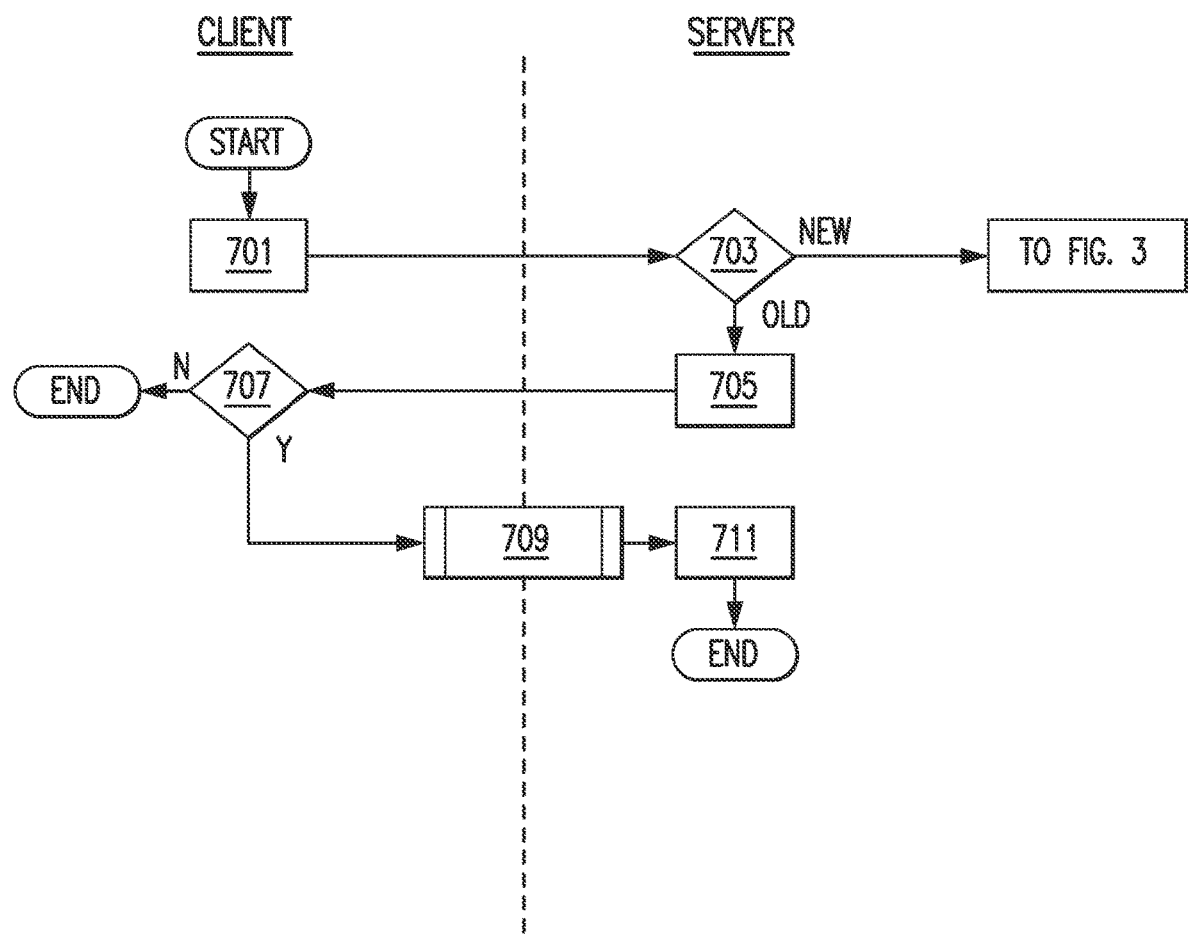
FIG. 7 is a flow diagram illustrating a flow of processes for transitioning an existing user from an old authentication method to a client registration, in accordance with an exemplary embodiment of the present invention.

A general flow of processes for transitioning an existing user using an old authentication method to a user registration by an authentication server, in accordance with an exemplary embodiment of the present invention, will now be described with reference to FIG. 7. Once all users have transitioned, this process can be phased out and all clients may default to the registration and authentication process, such as the embodiments illustrated in FIGS. 2 and 3.

At block 701, a client requests authentication on the authentication server. At block 703, the authentication server checks which authentication process is being used by the client. If the client is using the new authentication process, such as the embodiment illustrated in FIG. 3, then the authentication server proceeds through such authentication process as previously disclosed and concludes normally. If the client is using the old authentication process, the transition process continues to block 705.

At block 705, the client is authenticated using the old authentication process. This might be a username and password entry, a biometric authentication, or other authentication processes already known in the art, which will not be further described herein. A communication session may be initiated between the secure server and the client immediately, or at any later point in the process.

Optionally, at block 707, the user is given the option whether to transition to the new authentication process. If the user does not wish to transition, the process ends without transitioning the client; otherwise, the process continues to block 709. In certain implementations, this option is not presented, as the system owner may desire that the features of the new system be applied universally, and in such implementations the process moves from block 705 to block 709 without interruption.

Figure 2:
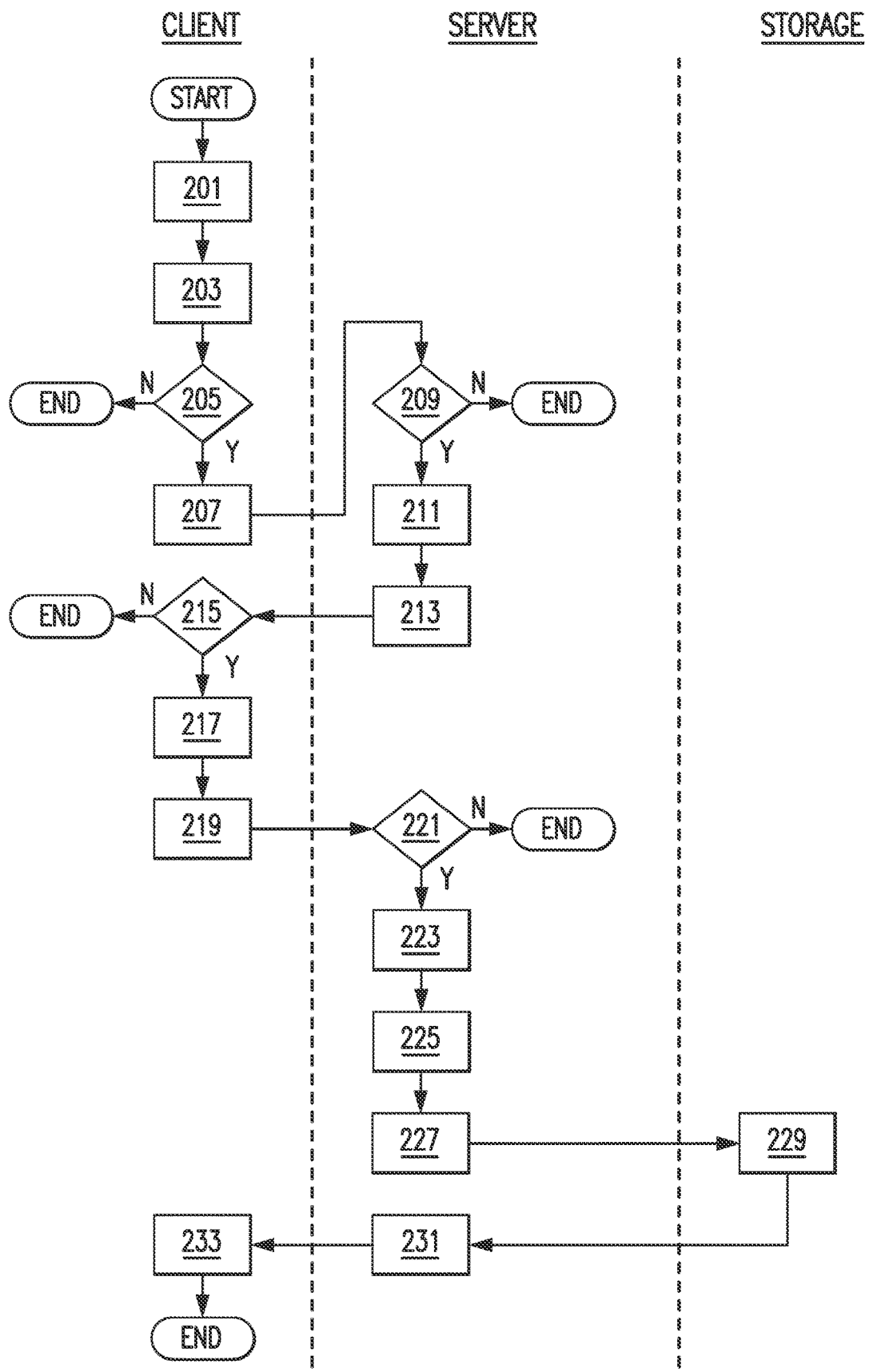
FIG. 2 is a flow diagram illustrating a flow of processes for client registration, in accordance with an exemplary embodiment of the present invention.

At block 709, a client registration process is executed, such as the embodiment illustrated in FIG. 2. It is noted that the contact information UContact or user profile data which is optionally provided, for example, at block 223 of the embodiment illustrated in FIG. 2, may be drawn from an existing user profile.

At block 711, the authentication server deletes the client information from any databases being used for the older authentication method, completing the transition. The user is enabled to use the new authentication process going forward. The process then ends.

The above description assumes that the same authentication server is used in both the old and new authentication processes. In some implementations, this is not the case, and the old authentication process is managed by another authentication server or the secure server itself. Preferably, where separate servers are respectively used in the old and new processes, the transition process is managed by the new authentication server, which signals the old authentication server or secure server at block 711 or another suitable time in the process to deactivate the information related to the client.

A general flow of processes for server registration, in accordance with an exemplary embodiment of the present invention, will now be described with reference to FIG. 8. It is noted that these processes make use of a server registrar, as shown for example in FIG. 1A. In certain embodiments, the registrar uses the same data storage system to register authentication servers that the authentication servers use to register clients. For convenience of description, this disclosure has described this storage arrangement when a client device or other device is described to retrieve this data. However, the invention is not so limited, and in alternate embodiments, a different data storage system is used, or the data is stored on the registrar's internal storage, and this data is retrieved in a manner suitable for its storage method.

At block 801, a public-private key pair ($S_{pub}$, $S_{priv}$) is generated for the authentication server. If the server already has a public-private key pair, this operation may be skipped.

At block 803, the authentication server requests registration by the server registrar. Preferably, the server sends the server public key ($S_{pub}$) and a server address such as a URL or IP address as part of the request. The request may also include other data, such as information about the server or the entity that owns it, and/or a signature formed by encrypting all other data in the request using the authentication server's private key $S_{priv}$. The request as a whole is preferably encrypted using the registrar's public key $R_{pub}$.

At block 805, the registrar confirms that the server request is valid. In various embodiments, this includes one or more of: verifying the signature against the rest of the request, and confirming that the authentication server is not already registered for the registrar. The last confirmation preferably includes accessing the data storage system to determine if a record (for example, a transaction in the blockchain) exists in association with the registrar and server's shared index ($R_{pub}+S_{pub}$). The server may also, in some embodiments, maintain its own list of registered servers.

Furthermore, optionally, the information about the authentication server and the entity owning it is reviewed. In various embodiments, this can be performed by any combination of automatic and manual review, according to the needs of the implementation and the provided information.

In various embodiments and implementations, reasons for rejecting the server registration after review can include but are not limited to: the entity is an entity deemed untrustworthy (e.g. a fraudulently operating or black market business, or a foreign and hostile nation), or the authentication server making the request does not appear in fact to be operated by the entity as claimed (e.g. an imposter server).

Optionally, the review process may determine that the authentication server has not provided sufficient information to accept or reject the registration. If such a determination is made, the process continues to block 807, and the registrar requests that the server provide additional information. The authentication server can then, at 809, either provide the additional information and return the process to block 803, or decide to cancel registration and end the process.

If the server request contains sufficient information to determine that the request is not valid at block 805, the process ends without registering the authentication server. If the server request contains sufficient information to determine that the request is valid at block 805, the process continues to block 811.

At block 811, the registrar requests that the data storage system generate a record (for example, a transaction in the blockchain) at the shared index $R_{pub}+S_{pub}$ for the registrar and the authentication server, and the record is so stored at block 813. The record includes a status flag indicating that the secure server having the public key $S_{pub}$ is valid and active, and preferably the authentication server's address on the network (e.g. a URL or IP address). In certain embodiments, the record also includes an expiration date, or the expiration date replaces the status flag.

As with block 229 of FIG. 2, in certain embodiments a suitable smart contract is generated which stores and manages some or all of the data elements of the record.

At block 815, the registrar receives verification that the record was generated, and at block 817 this verification is forwarded to the authentication server.

Optionally, at block 819, the authentication server confirms that the record is functioning, by searching the data storage system for a record with an active status flag and/or future expiration date at the shared index $R_{pub}+S_{pub}$. The secure server may then automatically alert the registrar or take other suitable actions if the record is incorrect or not found. The process then ends.

Figure 8:
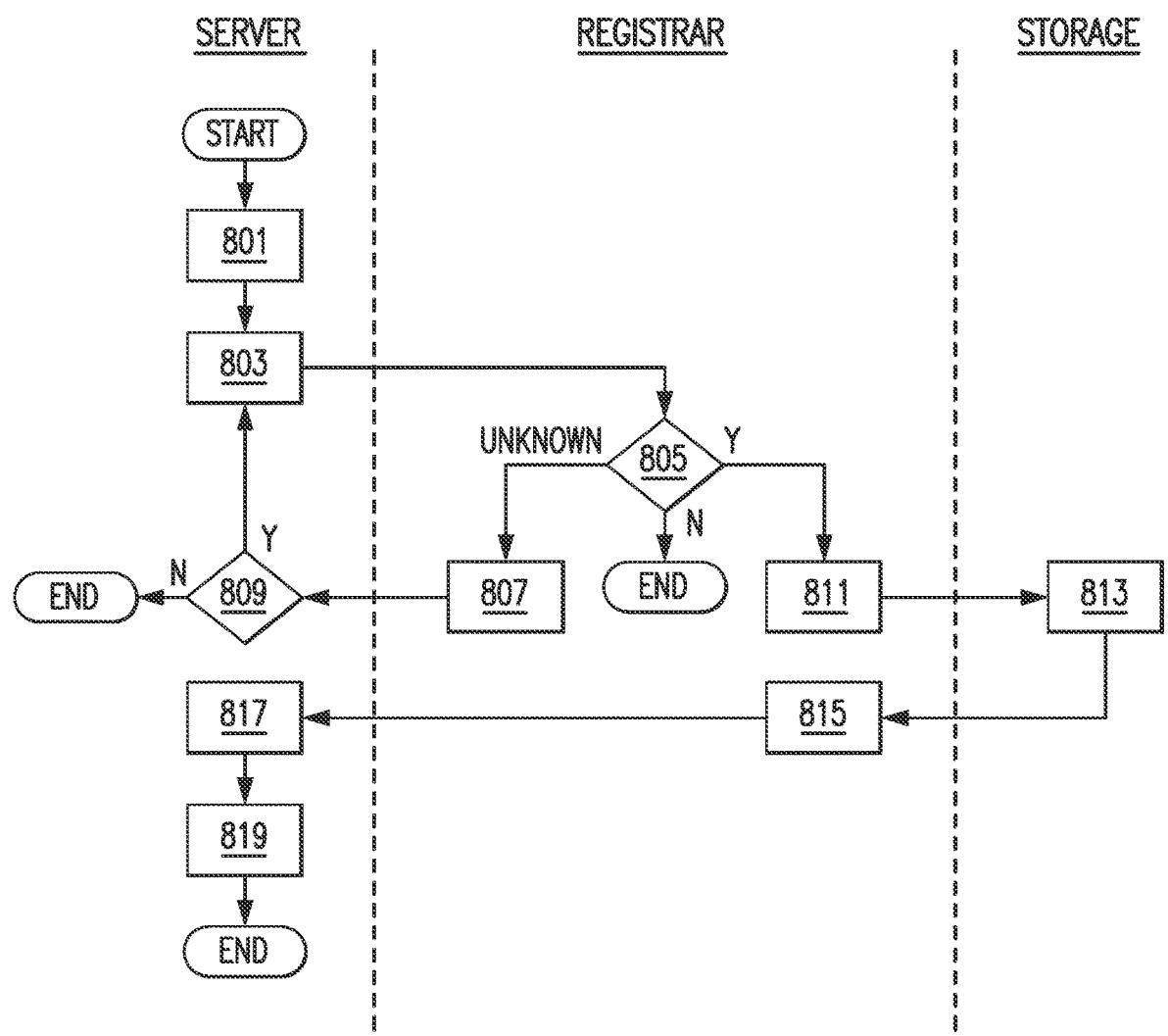
FIG. 8 is a flow diagram illustrating a flow of processes for server registration, in accordance with an exemplary embodiment of the present invention.

It is noted that the server registration process illustrated in FIG. 8, though optional, provides for added security, by enabling the registrar to confirm that an authentication server is legitimate and operating according to certain secure protocols such as those described herein, in response to a user query (for example, at blocks 203/205 of the embodiment illustrated in FIG. 2, or block 301 of the embodiment illustrated in FIG. 2).

It is generally noted that, although only certain aspects of the records in the data storage system have been described as manageable by a smart contract, this should not be viewed as limiting. It is, for example, within the scope of the invention for every record stored to the data storage system to be completely managed by one or more smart contracts, each establishing an index in another database where any or all data elements can be found. Additionally, these data elements are still immutably stored to the extent that any authorized changes thereto are reflected in an immutably stored record of that change.

Figure 9:
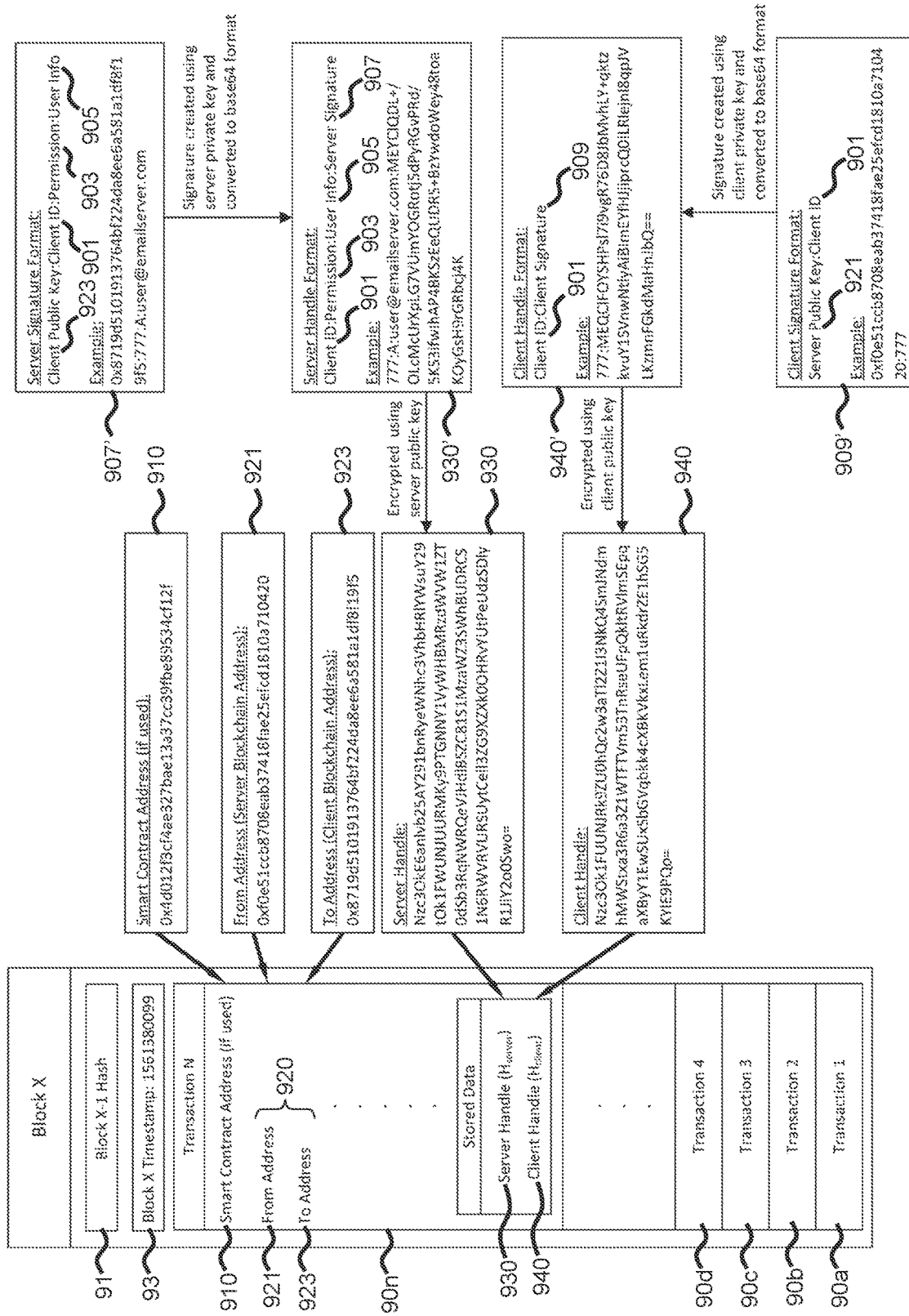
FIG. 9 is a depiction of an illustrative example of a data record format, in accordance with an exemplary embodiment of the present invention.

FIG. 9 shows one of numerous illustrative examples of implementations of a block, containing at least one transaction, which may be immutably recorded in a blockchain. While FIG. 9 assumes that a blockchain network is being used for the data storage system, one of skill in the art will be able to modify the "block" to serve as a record in another form of data storage.

The block includes a hash 91 of the previous block, and also preferably includes a timestamp 93 of the present block. If the block is the first block of the blockchain, the hash 91 is omitted or replaced with null data.

The block also includes a series of transactions 90a through 90n, which are representations of alterations to the record. In this example, transaction 90n is specifically associated with the combination of a particular client device and a particular authentication server, and reflects an amendment to the information related to this combination, such as the registration of the client device on the server, or a change to the server handle. Other transactions 90a, 90b, etc. in the block can also be changes to the authentication records for other clients, and if so are preferably implemented in the same manner as transaction 90n. However, it is noted that the system can be implemented such that the other transactions 90a, 90b, etc. can be unrelated to client authentication records, and can instead relate to cryptocurrency transactions or other records.

In some embodiments, transaction 90n includes an address 910 for a smart contract related to the particular combination of client and authentication server. In other embodiments, an entire smart contract, or the source code for the smart contract, is stored in the transaction. In still other embodiments, a smart contract is not implemented.

Transaction 90n includes the respective public keys 921, 923 of the authentication server and client, which, as noted previously, collectively serve as the index or "address" 920 of transactions related to the particular combination of client and authentication server. The server public key 921 may be termed a "from address" and the client public key 923 may be termed a "to address" in this context. A search of the blockchain will identify that transaction 90n relates to this combination of server and client. In some embodiments, the smart contract or smart contract address 910 replaces the server public key 921.

Transaction 90n also includes the stored data for the record, reflecting its state as of the transaction, which includes the server handle 930 and the client handle 940. As noted herein, in some embodiments implementing a smart contract, these handles preferably are not stored in transactions but in a separate storage, and are managed by the smart contract. The stored data in such embodiments instead suitably reflects changes to these handles and/or other data elements.

The server handle 930 is an encryption, by the server public key 921, of a combination of data elements 930' which include the client identifier 901, the client permission 903, the user contact information 905, and the server's signature 907.

In the illustrated implementation and example, the server data elements 930' are concatenated before encryption into the server handle 930, with each data element separated by a colon. The client identifier 901 is a unique character string, in this example the numbers "777." The client permission 903 is "A" which may designate a particular access level on an enumerated scale. The user contact information 905 is an email address. The server's signature 907 is the result of encrypting, using the server's private key, a concatenation 907' of the client public key 923, the client identifier 901, the client permission 903, and the user contact information 905.

It is again noted that the user contact information 905 may be replaced with a series of user data points which collectively form a user profile.

The client handle 940 is an encryption, by the client public key, of a combination of data elements 940' which include the client identifier 901 and the client's signature 909.

In the illustrated implementation and example, the client data elements 940' are concatenated before encryption into the client handle 940, with each data element separated by a colon. The client identifier 901 is a unique character string, in this example the numbers "777." The client's signature 909 is the result of encrypting, using the client's private key, a concatenation 909' of the server public key 921 and the client identifier 901.

One of skill in the art will understand that the example format of the server and client handles prior to encryption, as illustrated in FIG. 9, is but one of a variety of suitable formats. In particular, as noted elsewhere, certain implementations do not include, for example, the client permission 903 or user contact information 905 in the server handle data elements 930', but manage this data via an implemented smart contract such as indicated by the address 910.

It is again noted that the transactions which form the record may be included among other transactions which are not related to user authentication, such as cryptocurrency transactions, with all transactions stored to the same block and the same blockchain. This enables the present invention, in some embodiments, to use the same blockchain network both for authentication and for other purposes, and even to "piggyback" on an existing blockchain network such as Bitcoin or Ethereum. Additionally, if a cryptocurrency blockchain network is used as the data storage, the currency services may finance the system, enabling the authentication service to be offered for free.

These and related processes, and other necessary instructions, are preferably encoded as executable instructions on one or more non-transitory computer readable media, such as hard disc drives or optical discs, and executed using one or more computer processors, in concert with an operating system or other suitable measures.

The descriptions above are intended to illustrate possible implementations of the disclosed system and method, and are not restrictive. While this disclosure has been made in connection with specific forms and embodiments thereof, it will be appreciated that various modifications other than those discussed above may be resorted to without departing from the spirit or scope of the disclosed system and method. Such variations, modifications, and alternatives will become apparent to the skilled artisan upon a review of the disclosure. For example, functionally equivalent elements or method operations are substitutable for those specifically shown and described, and certain features are usable independently of other features. Additionally, in various embodiments, all or some of the above embodiments are selectively combined with each other, and particular locations of elements or sequence of method operations are reversed or interposed, all without departing from the spirit or scope of the disclosed system and method as defined in the appended claims. The scope should therefore be determined with reference to the description above and the appended claims, along with their full range of equivalents.

What is claimed is:

1. A method for controllably restricting access to a physical secure server, the physical secure server being configured for selective communication through a communications network with a user operating a physical client device for an authentication-based interactive communication session therewith, the authentication-based interactive communication session being initiated by the user through the respective physical client device, the method comprising:

generating a client identifier parameter uniquely associated with the physical client device of a corresponding user, the client identifier parameter being generated by an identifier allocator submodule of a hardware processor subsystem of a physical authentication server;

storing, by a storage request submodule of the hardware processor subsystem of the physical authentication server, the client identifier parameter in at least first and second predetermined storage forms as immutable records within a physical distributed data storage system, wherein the client identifier parameter in the first predetermined storage form is readable from the physical distributed data storage system exclusively by the physical client device of the respective user uniquely associated therewith, and wherein the client identifier parameter in the second predetermined storage form is readable from the physical distributed data storage system exclusively by the hardware processor subsystem of the physical authentication server; and executing the physical authentication server to selectively authenticate the user to launch an interactive communication session between the physical client device of the respective user and the physical secure server, the selective authentication including:

comparing the client identifier parameter as independently retrieved from the physical distributed data storage system, respectively, by the physical client device and the hardware processor subsystem of the physical authentication server, the comparison being executed by a user authenticator submodule of the hardware processor subsystem of the physical authentication server, and the interactive communication session being selectively launched by a physical communication module of the physical authentication server responsive to execution of the comparison, wherein the physical communication module is coupled to the hardware processor subsystem of the physical authentication server; and deleting the client identifier parameter from both a physical memory, respectively, of the physical client device and the physical authentication server upon launching of the interactive communication session.

2. The method of claim 1, wherein the physical distributed data storage system is a distributed data storage system openly accessible through the communications network.

3. The method of claim 2, wherein the physical distributed data storage system is a blockchain network, and the first and second predetermined storage forms of the client identifier parameter are immutably stored in a blockchain as a record associated with both the physical client device and the physical secure server.

4. The method of claim 1, wherein a smart contract is established between the physical client device and the physical secure server, the smart contract executing to store the first and second predetermined storage forms of the client identifier parameter in a smart contract storage.

5. The method of claim 1, wherein the client identifier parameter is a character string.

6. The method of claim 1, wherein the first predetermined storage form of the client identifier parameter includes the client identifier parameter encrypted by a client encryption key, the first predetermined storage form of the client identifier parameter thereby decryptable by a client decryption key to be stored exclusively on the corresponding physical client device of the respective user.

7. The method of claim 6, wherein the client encryption key is a character string, and the first predetermined storage form of the client identifier parameter is indexed in the physical distributed data storage system at least in part according to the client encryption key.

8. The method of claim 1, wherein the second predetermined storage form of the client identifier parameter includes the client identifier parameter encrypted by a server encryption key, the second predetermined storage form of the client identifier parameter thereby decryptable by a server decryption key to be stored on the physical authentication server.

9. The method of claim 8, wherein the server encryption key is a character string, and the second predetermined storage form of the client identifier parameter is indexed in the physical distributed data storage system at least in part according to the server encryption key.

10. A system for controllably restricting access to a physical secure server, the physical secure server being configured for selective communication through a communications network with a user operating a physical client device for an authentication-based interactive communication session therewith, the authentication-based interactive communication session being initiated by the user through the respective physical client device, the system comprising:
a physical hardware processor subsystem, the physical hardware processor subsystem including an identifier allocator submodule, the identifier allocator submodule being configured to generate a client identifier parameter uniquely associated with the physical client device of a corresponding user;
a physical distributed data storage system configured to store data transmitted thereto as immutable records; and
a physical authentication server including:
a hardware server processor subsystem including a storage request submodule and a user authenticator submodule;
the storage request submodule configured to store on the physical distributed data storage system at least the client identifier parameter in a first predetermined storage form readable exclusively by a corresponding physical client device of the respective user uniquely associated therewith and the client identifier parameter in a second predetermined storage form readable exclusively by the physical authentication server, and
the user authenticator submodule configured to compare the client identifier parameter as independently retrieved from the physical distributed data storage system, respectively, by the physical client device and the physical authentication server, and
a physical communication module coupled to the hardware server processor subsystem and configured to selectively launch the interactive communication session between the physical client device of the respective user and the physical secure server responsive to execution of the comparison by the user authenticator submodule, the client identifier parameter being deleted from both a physical memory, respectively, of the physical client device and the physical authentication server upon launching of the interactive communication session.

11. The system of claim 10, wherein the physical distributed data storage system is a distributed data storage system openly accessible through the communications network.

12. The system of claim 11, wherein the physical distributed data storage system is a blockchain network, and the first and second predetermined storage forms of the client identifier parameter are immutably stored in a blockchain as a record associated with both the physical client device and the physical secure server.

13. The system of claim 10, wherein a smart contract is established between the physical client device and the physical secure server, the smart contract executing to store the first and second predetermined storage forms of the client identifier parameter in a smart contract storage.

14. The system of claim 10, wherein the first predetermined storage form of the client identifier parameter includes the client identifier parameter encrypted by a client encryption key, the first predetermined storage form of the client identifier parameter thereby decryptable by a client decryption key to be stored exclusively on the corresponding physical client device of the respective user.

15. The system of claim 14, wherein the client encryption key is a character string, and the first predetermined storage form of the client identifier parameter is indexed in the physical distributed data storage system at least in part according to the client encryption key.

16. The system of claim 10, wherein the second predetermined storage form of the client identifier parameter includes the client identifier parameter encrypted by a server encryption key, the second predetermined storage form of the client identifier parameter thereby decryptable by a server decryption key to be stored on the physical authentication server.

17. The system of claim 16, wherein the server encryption key is a character string, and the second predetermined storage form of the client identifier parameter is indexed in the physical distributed data storage system at least in part according to the server encryption key.

18. The system of claim 10, wherein the hardware server processor subsystem of the physical authentication server, also, operates as the physical hardware processor subsystem, and, thereby includes, as an additional submodule, the identifier allocator submodule.

19. The system of claim 10, further comprising a server registrar, wherein the physical authentication server is registered by the server registrar in the physical distributed data storage system for validation by the physical client device.

20. A system for controllably restricting user authentication to selectively establish a restricted communication session between a physical secure server and a physical client device operated by a user, the system comprising:
a physical hardware processor subsystem, the physical hardware processor subsystem including an identifier allocator submodule configured to generate a client identifier value uniquely associated with the physical client device of a corresponding user;
a physical distributed data storage system openly accessible through a communications network and configured to store records in an immutable state; and
a physical authentication server, including:
a hardware server processor subsystem including a storage request submodule, a user authenticator submodule, and an encryption submodule;
the storage request submodule being configured to store on the physical distributed data storage system at least the client identifier value in a first predetermined storage form which is readable from the physical distributed data storage system exclusively by the physical client device uniquely associated therewith and the client identifier value in a second predetermined storage form which is readable exclusively from the physical distributed data storage system by the physical authentication server, wherein the encryption submodule at least encrypts the client identifier values in the first and second predetermined storage forms prior to the client identifier value in the first predetermined storage form and the client identifier value in the second predetermined storage form being stored on the physical distributed data storage system, and the user authenticator submodule being configured to compare the client identifier value as independently retrieved from the physical distributed data storage system, respectively, by the physical client device and the physical authentication server, and a physical communication module coupled to the hardware server processor subsystem and configured to selectively launch the restricted communication session between the physical client device of the user and the physical secure server responsive to the comparison executed by the user authenticator submodule, the client identifier value being deleted from both a physical memory, respectively, of the physical client device and the physical authentication server upon launching of the restricted communication session.

\* \* \* \* \*